US012589544B2

(12) United States Patent
Hattab

(10) Patent No.: US 12,589,544 B2
(45) Date of Patent: Mar. 31, 2026

(54) THREE-PIECE MOLD DEVICE, SYSTEM, AND METHOD FOR MANUFACTURING OF CONNECTABLE BEVERAGE BOTTLE

(71) Applicant: Hattab Global Corp., Ottawa (CA)

(72) Inventor: Alaa Mohamed Hattab, Ottawa (CA)

(73) Assignee: Hattab Global Corp., Tucson, AZ (US)

( * ) Notice: Subject to any disclaimer, the term of this patent is extended or adjusted under 35 U.S.C. 154(b) by 260 days.

(21) Appl. No.: 18/206,896

(22) Filed: Jun. 7, 2023

(65) Prior Publication Data

US 2024/0017471 A1 Jan. 18, 2024

Related U.S. Application Data

(60) Provisional application No. 63/389,117, filed on Jul. 14, 2022.

(51) Int. Cl.
| | |
|---|---|
| *B29C 49/48* | (2006.01) |
| *B29C 49/02* | (2006.01) |
| *B65D 1/02* | (2006.01) |
| *B65D 1/40* | (2006.01) |
| *B65D 21/02* | (2006.01) |
| *B29L 31/00* | (2006.01) |

(52) U.S. Cl.
CPC ........ *B29C 49/4802* (2013.01); *B65D 1/0223* (2013.01); *B65D 1/40* (2013.01); *B65D 21/0202* (2013.01); *B29C 49/02* (2013.01); *B29C 2049/4882* (2013.01); *B29C 2049/4892* (2013.01); *B29L 2031/7158* (2013.01)

(58) Field of Classification Search
CPC .................. B29C 2049/4892; B29C 49/02
See application file for complete search history.

(56) References Cited

U.S. PATENT DOCUMENTS

| | | |
|---|---|---|
| 1,396,293 A | 11/1921 | Sitzler |
| D201,470 S | 6/1965 | Plattner |
| (Continued) | | |

FOREIGN PATENT DOCUMENTS

| | | |
|---|---|---|
| EP | 1705124 | 9/2006 |
| WO | 2003055756 | 7/2003 |

OTHER PUBLICATIONS

Bill Lindsay, Bottle Body Characteristics & Mold Seams, Website, Apr. 6, 2022, https://sha.org/bottle/body.htm, 56 pages, USA.
(Continued)

*Primary Examiner* — Seyed Masoud Malekzadeh
(74) *Attorney, Agent, or Firm* — COZEN O''CONNOR

(57) ABSTRACT

A system for molding includes: right and left upper mold portions; and a lower mold portion, such that the right and left upper mold portions are positionable side by side and the lower mold portion is positionable between lower ends of the right and left upper mold portions to form an entire molding cavity for blow molding a connectable beverage bottle, such that the lower mold portion is vertically downward removable and the right and left upper mold portions are laterally removable after blow molding of the connectable beverage bottle. Also disclosed is a method of molding, including: preparing blow pin, assembling mold components, performing blow molding, removing blow pin, disassembling mold components, and extracting the connectable beverage bottle.

10 Claims, 30 Drawing Sheets

(56)　　　　　References Cited

U.S. PATENT DOCUMENTS

| | | | |
|---|---|---|---|
| 3,914,105 | A | 10/1975 | Pivar |
| D239,697 | S | 4/1976 | Hunt |
| 3,994,408 | A | 11/1976 | Belitzky |
| 4,012,827 | A | 3/1977 | Abrams |
| 4,070,428 | A | 1/1978 | Krall et al. |
| 4,177,239 | A | 12/1979 | Gittner et al. |
| 4,310,282 | A | 1/1982 | Spurr |
| 4,467,929 | A * | 8/1984 | Jakobsen ................. B29C 49/14 |
| | | | 264/530 |
| 4,615,925 | A * | 10/1986 | Nilsson ................. B29C 49/541 |
| | | | 215/12.2 |
| 4,701,121 | A * | 10/1987 | Jakobsen ............. B65D 1/0207 |
| | | | 425/525 |
| 5,133,469 | A | 7/1992 | Mehta |
| 5,160,749 | A | 11/1992 | Fogarty |
| D347,579 | S | 6/1994 | Hann |
| D356,542 | S | 3/1995 | Finkiewicz |
| 5,400,911 | A | 3/1995 | Mahajan |
| 5,776,518 | A | 7/1998 | Wohlgemuth |
| 5,980,806 | A | 11/1999 | Ohmi et al. |
| D446,726 | S | 8/2001 | Hall |
| D449,778 | S | 10/2001 | Legoupil |
| D482,285 | S | 11/2003 | Desouza |
| D488,386 | S | 4/2004 | Hall |
| D510,705 | S | 10/2005 | Crawford |
| 7,178,687 | B1 | 2/2007 | Manderfield, Jr. et al. |
| 7,267,537 | B2 * | 9/2007 | Mitchell ................. B29C 49/56 |
| | | | 425/182 |
| D563,788 | S | 3/2008 | Reimann |
| D595,140 | S | 6/2009 | Reimann |
| 7,891,968 | B2 * | 2/2011 | Lesueur ................. B29C 49/12 |
| | | | 425/525 |
| 8,348,077 | B2 | 1/2013 | Wimmer |
| D721,970 | S | 2/2015 | Snyder |
| 9,636,888 | B2 | 5/2017 | Roychoudhury |
| D788,588 | S | 6/2017 | Heisner |
| 10,384,831 | B2 | 8/2019 | Vlahakis |
| 10,472,117 | B1 | 11/2019 | Meyer |
| 11,179,875 | B1 * | 11/2021 | Bhat ....................... B33Y 80/00 |
| D941,152 | S | 1/2022 | Meyer |
| 11,213,992 | B2 * | 1/2022 | Suga .................... B65D 1/0223 |
| 11,534,953 | B2 * | 12/2022 | Hendrickson .......... B29C 49/56 |
| D993,029 | S | 7/2023 | Bobkov |
| 11,759,992 | B2 * | 9/2023 | Bhat ................... B29C 49/4823 |
| | | | 425/526 |
| D1,048,886 | S | 10/2024 | Mahgoub |
| 2006/0078643 | A1 * | 4/2006 | Mitchell ................. B29C 49/48 |
| | | | 425/541 |
| 2006/0231985 | A1 * | 10/2006 | Kelley .................. B29C 49/482 |
| | | | 425/522 |
| 2009/0090647 | A1 | 4/2009 | Panchal |
| 2010/0308043 | A1 | 12/2010 | Wimmer |
| 2013/0153576 | A1 | 6/2013 | Wilkes |
| 2014/0263160 | A1 * | 9/2014 | Guerin ..................... B65D 1/40 |
| | | | 425/525 |
| 2016/0136865 | A1 * | 5/2016 | Guerin ............... B29C 49/4237 |
| | | | 29/401.1 |
| 2016/0272368 | A1 | 9/2016 | Buck |
| 2018/0194058 | A1 * | 7/2018 | Hendrickson .......... B29C 49/06 |
| 2021/0268697 | A1 * | 9/2021 | Hendrickson .......... B29C 49/54 |
| 2021/0394423 | A1 | 12/2021 | Everett et al. |
| 2022/0152908 | A1 * | 5/2022 | Bhat ................... B29C 49/4823 |
| 2024/0009914 | A1 * | 1/2024 | Bhat ....................... B33Y 80/00 |
| 2024/0017471 | A1 * | 1/2024 | Hattab ............... B65D 21/0204 |
| 2024/0017882 | A1 | 1/2024 | Hattab |

OTHER PUBLICATIONS

The First Interlocking Plastic Bottle, posted Sep. 9, 2022 [retrieved Jan. 17, 2025]. Retrieved from internet, https://finance.yahoo.com/news/first-interlocking-plastic-bottle-launched-002000976.html (Year: 2022).

Saniton Plastic, posted Dec. 2, 2022 [retrieved Jan. 17, 2025]. Retrieved from internet, https://www.youtube.com/watch?v=BHayJzVGPHQ&t=3s (Year: 2022).

Interlocking nail polish bottle, posted date not available [retrieved Jan. 17, 2025]. Retrieved from internet, https://www.alibaba.com/product-detail/7ml-Double-Nail-Polish-Bottle-interlocking_1660254729.html?spm=a2700.7724857.0.0.7b7053d57qB4CT (Year: 2025).

International Search Reported dated Dec. 13, 2023, issued in the a corresponding PCT Application.

International Search Reported dated Oct. 3, 2023, issued in the a corresponding PCT Application.

* cited by examiner

System for Molding

Method for Molding

THREE-PIECE MOLD DEVICE, SYSTEM, AND METHOD FOR MANUFACTURING OF CONNECTABLE BEVERAGE BOTTLE

CROSS-REFERENCE TO RELATED APPLICATIONS

This application claims the benefit of U.S. Provisional Application No. 63/389,117, filed Jul. 14, 2022; which is hereby incorporated herein by reference in its entirety.

FIELD OF THE INVENTION

The present invention relates generally to the field of molds and mold systems for bottle manufacturing, and more particularly to methods and systems for a three-piece mold device and system for manufacturing of a connectable beverage bottle.

BACKGROUND OF THE INVENTION

Interlocking connectable beverage bottle designs are well-known, and offer the opportunity for improved storage density, and can therefore reduce logistics cost for transport and storage.

However, such interlocking connectable beverage bottle designs have not gained widespread use, as they have proved difficult or impossible to manufacture using well-known bottle molding methods.

As such, considering the foregoing, it may be appreciated that there continues to be a need for novel and improved devices, systems and methods for manufacturing of connectable beverage bottles.

SUMMARY OF THE INVENTION

The foregoing needs are met, to a great extent, by the present invention, wherein in aspects of this invention, enhancements are provided to the existing model of manufacturing of connectable beverage bottles.

In an aspect, a system for molding can include:
a) a left upper mold portion, which comprises a left upper molding cavity;
b) a right upper mold portion, which comprises a right upper molding cavity; and
c) a lower mold portion;
wherein the left upper mold portion and the right upper mold portion can be positionable side by side, such that the left upper molding cavity and the right upper molding cavity form a combined upper molding cavity for an upper portion of a connectable beverage bottle, such that the left upper mold portion and the right upper mold portion are laterally removable after blow molding of the connectable beverage bottle inside the combined upper molding cavity formed by the left upper mold portion and the right upper mold portion; and
wherein the lower mold portion is positionable between lower ends of the left upper mold portion and the right upper mold portion, such that the combined lower molding cavity combines with the combined upper molding cavity to form an entire molding cavity, such that the lower mold portion is vertically downward removable after blow molding of the connectable beverage bottle inside the combined upper molding cavity formed by the left upper mold portion and the right upper mold portion.

In an aspect, a method for molding can include:
a) Preparing blow pin, wherein a heated preform mold is prepared around the blow pin, which is positioned for mold assembly;
b) Assembling mold components, wherein the mold components are positioned relative to the blow pin, such that:
  i. the lower mold portion is moved vertically upwards to a predetermined molding position of the lower mold portion (relative to the blow pin with the prepared preform mold);
  ii. the left upper mold portion and the right upper mold portion are moved laterally inward, such that the left upper mold portion and the right upper mold portion are positioned side by side;
    such that upper parts of the left upper mold portion and the right upper mold portion connect around an upper part of the blow pin, and
    such that lower parts of the left upper mold portion and the right upper mold portion connect around an upper part of the lower mold portion;
    such that the blow pin with the attached preform mold protrudes into the entire molding cavity formed by the lower mold portion, the left upper mold portion and the right/second upper mold portion;
c) Perform blow molding, wherein compressed air is injected into the blow pin, such that the heated preform mold is blown into the shape of the entire molding cavity to form a connectable beverage bottle;
d) Removing blow pin, wherein the blow pin is extracted by a vertical upward movement;
e) Disassembling mold components, such that:
  i. the left upper mold portion and the right upper mold portion are moved laterally outward; and
  ii. the lower mold portion is moved vertically downwards; and
f) Extracting the connectable beverage bottle.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Figure 1D:
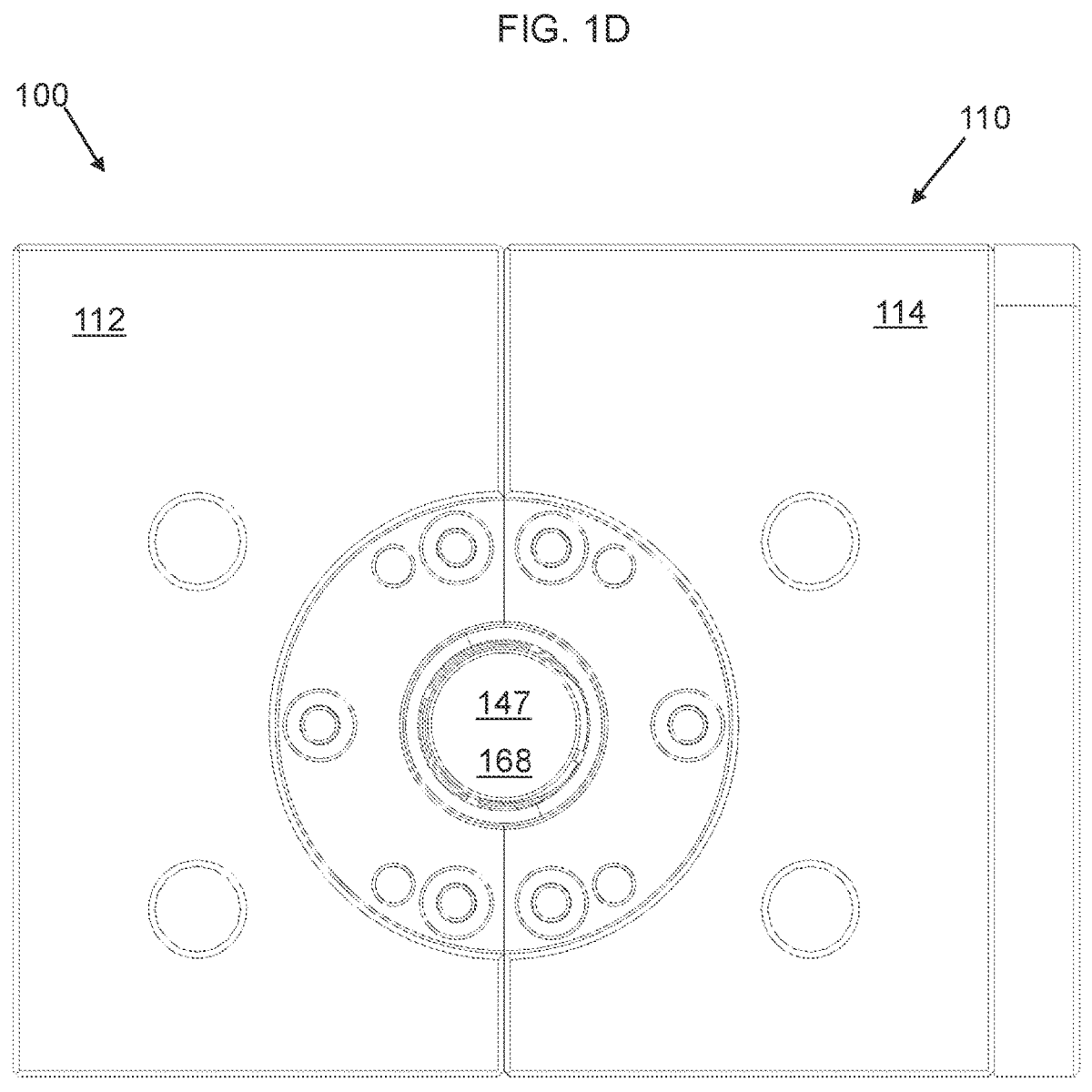

FIG. 1D is a top plan view of a system for molding in an assembled configuration, according to an embodiment of the invention.

FIG. 10A is a cross-sectional schematic view of a molding machine that uses a plurality of molding systems for manufacturing of connectable beverage bottles.

DETAILED DESCRIPTION

Figure 1A:
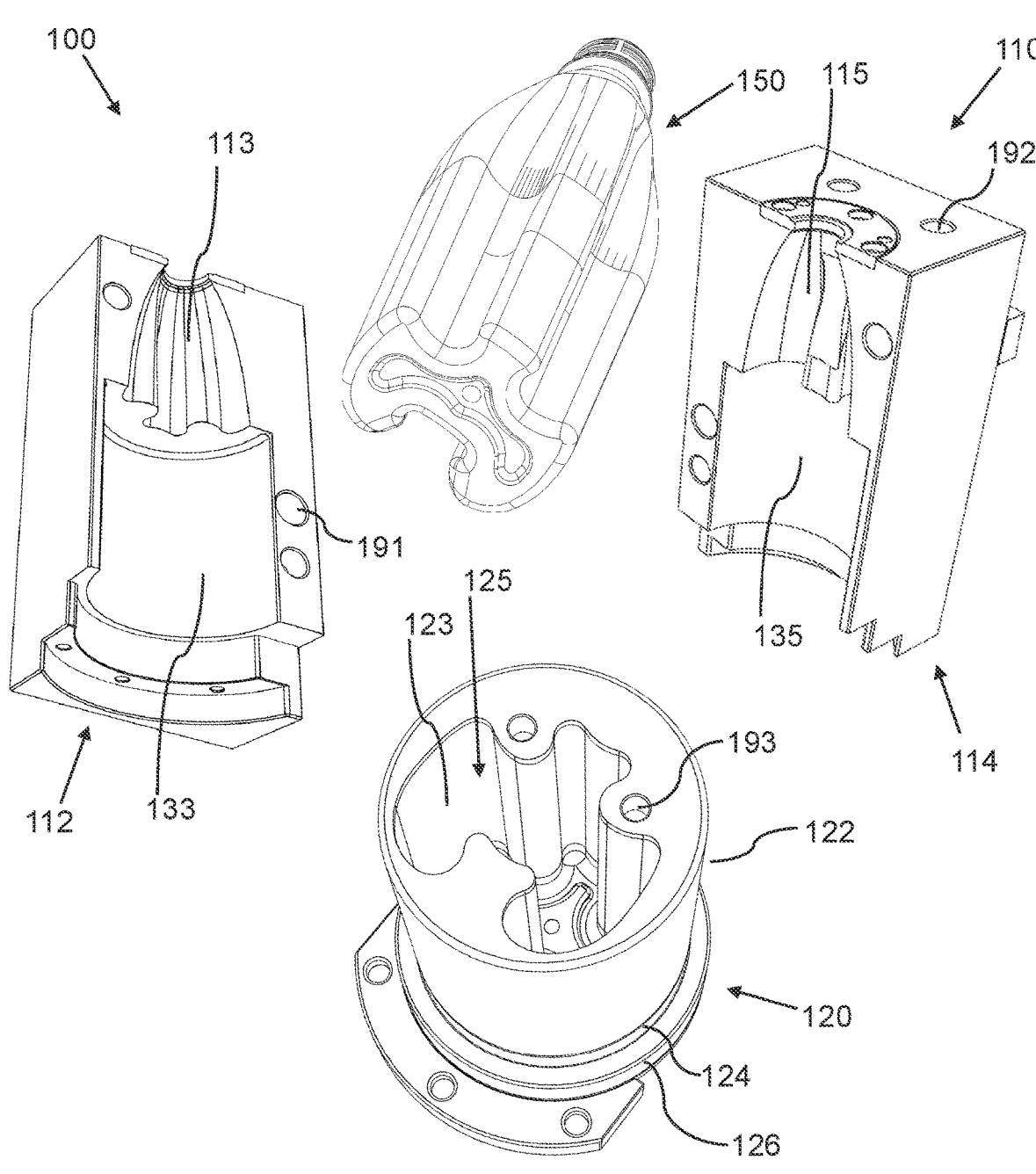
FIG. 1A is a perspective view of a system for molding in a disassembled configuration, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a system for molding 100 with reference to FIG. 1A, in such manner that like reference numerals refer to like components throughout; a convention that we shall employ for the remainder of this specification. The system for molding 100 enables manufacturing of bottles that can interlock with, so that they may save space in logistics, such as during transport and storage, thereby improving space efficiency and cost efficiency.

Figures 6A, 6B, 6C, 6D:
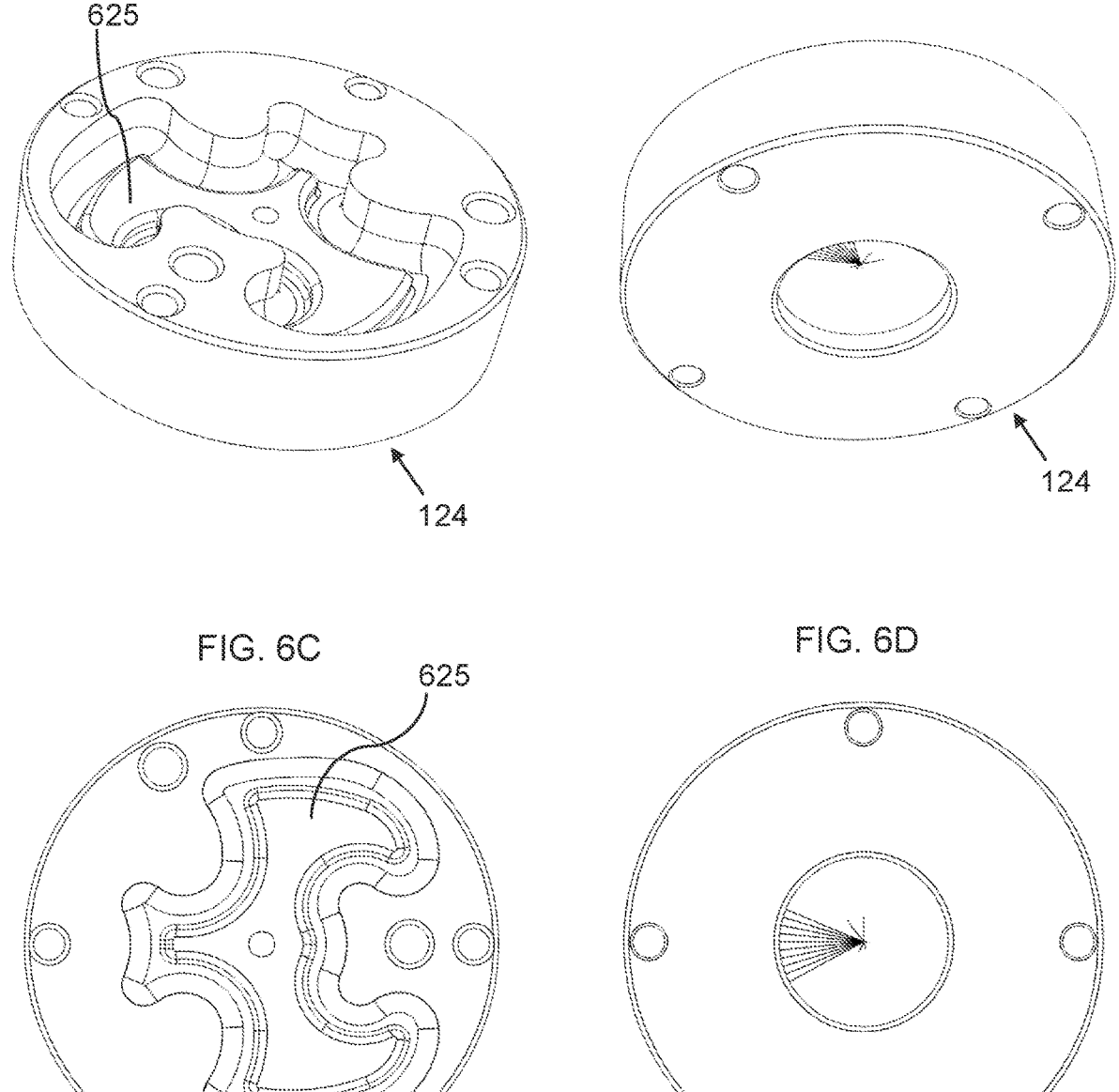
FIG. 6A is a front top perspective view of a lower bottom mold portion, according to an embodiment of the invention.
FIG. 6B is a rear bottom perspective view of a lower bottom mold portion, according to an embodiment of the invention.
FIG. 6C is a top plan view of a lower bottom mold portion, according to an embodiment of the invention.
FIG. 6D is a bottom plan view of a lower bottom mold portion, according to an embodiment of the invention.
Figure 7A:
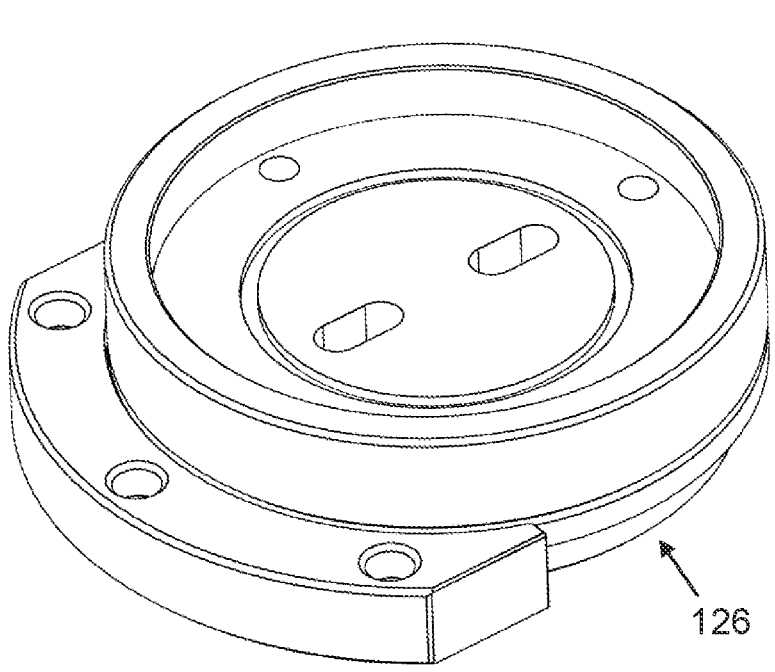
FIG. 7A is a front top perspective view of a lower mold support assembly, according to an embodiment of the invention.
Figure 7B:
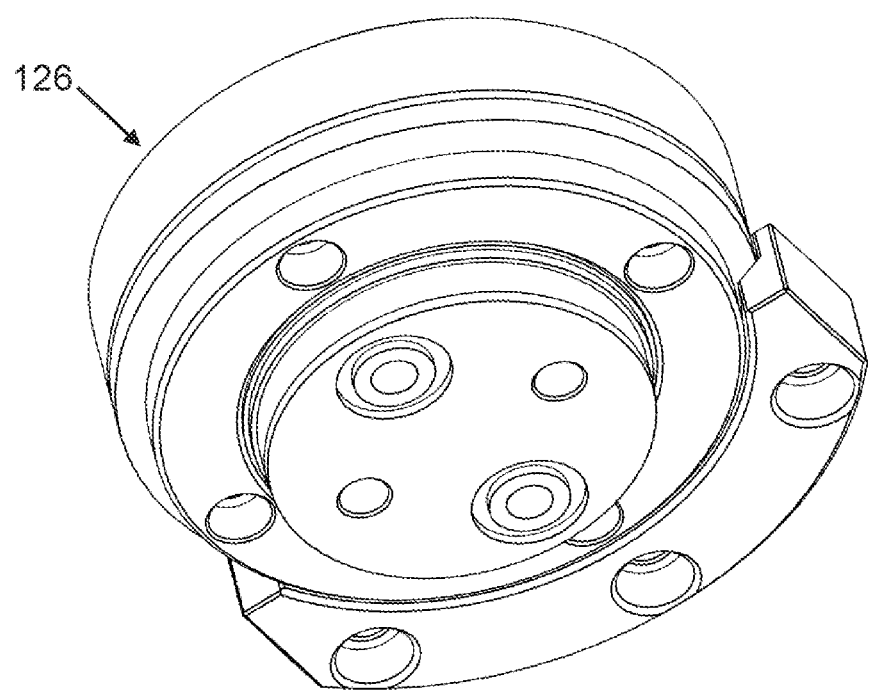
FIG. 7B is a rear bottom perspective view of a lower mold support assembly, according to an embodiment of the invention.

In an embodiment, as shown in FIGS. 1A-1G, 2A-2F, 3A-3F, 4A-4F, 5A-5D, 6A-6D, 7A-7B, 8A-8I, and 9B, a molding system 100 for molding a connectable beverage bottle 150 can include:

a) a molding device 110, which can include:
   i. a left/first upper mold portion 112, which can include a left upper molding cavity 113;
   ii. a right/second upper mold portion 114, which can include a right upper molding cavity 115; and
   iii. a lower mold portion 120, which is configured to mold a lower portion of the connectable beverage bottle 150, wherein can include:
      1) a lower central mold portion 122, which can include a penetrating lower central aperture 123, which is configured to mold (i.e., forms a mold for) a lower central portion of the connectable beverage bottle 150; and
      2) a lower bottom mold portion 124, which is connected to a bottom of the lower central mold portion 122, wherein the lower bottom mold portion 124 can include a lower bottom indentation 625 (as shown in FIGS. 6A and 6C), which is configured to mold (i.e., forms a mold for) a lower bottom portion of the connectable beverage bottle 150, such that the penetrating lower central aperture 123 and the lower bottom indentation 625 combine to form a combined lower molding cavity 125; and
      3) a lower mold support assembly 126, which is connected to a bottom of the lower bottom mold portion 124, such that the lower mold support assembly 126 provides support for the lower central mold portion 122 and the lower bottom mold portion 124 (which together contain/form the combined lower molding cavity 125), and
      wherein the lower mold support assembly 126 can be configured to connect with a molding machine 1000 to enable a vertical movement 922, 924 (i.e., a vertical upward movement 922 and a vertical downward movement 924) of the lower mold portion 120, as shown in FIGS. 9B and 10A-10C;
   wherein the left/first upper mold portion 112 and the right/second upper mold portion 114 are configured to be positioned side by side (i.e., adjacently), such that the left upper molding cavity 113 and the right upper molding cavity 115 form a combined upper molding cavity 1015 (shown in FIG. 10C) which is configured to mold an upper portion of a connectable beverage bottle 150, such that the left/first upper mold portion 112 and the right/second upper mold portion 114 are laterally/horizontally 932, 934 removable after blow molding of the connectable beverage bottle 150 inside the combined upper molding cavity 1015 formed by the left/first upper mold portion 112 and the right/second upper mold portion 114; and wherein at least an upper part of the lower mold portion 120 is positionable between lower ends of the left/first upper mold portion 112 and the right/second upper mold portion 114, such that the combined lower molding cavity 125 combines with the combined upper molding cavity 1015 to form an entire molding cavity 1025, which is configured to mold the connectable beverage bottle 150, such that the lower mold portion 120 is vertically downward 924 removable after blow molding of the connectable beverage bottle 150 inside the upper molding cavity formed by the left/first upper mold portion 112 and the right/second upper mold portion 114.

Figure 8A:
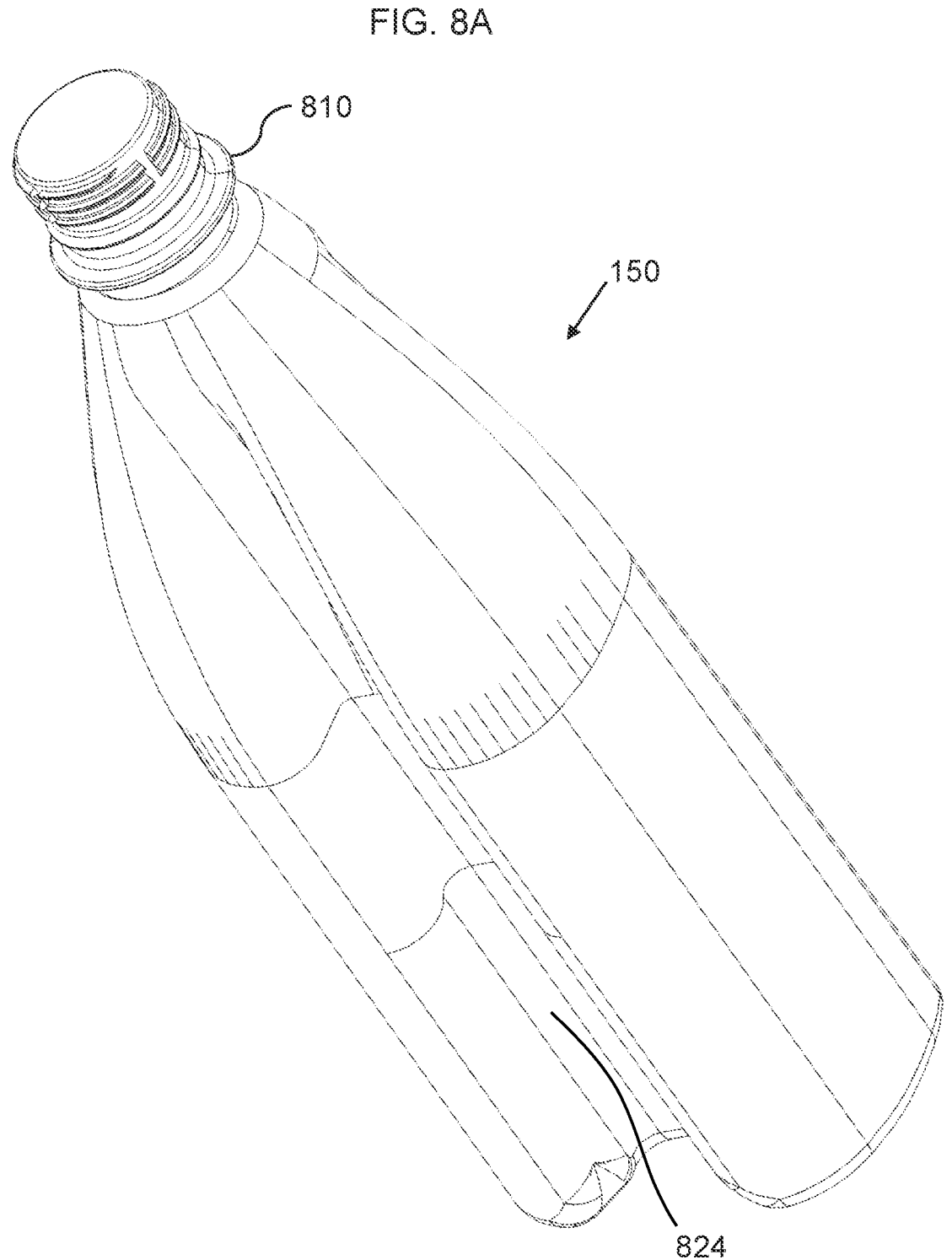
FIG. 8A is a top perspective view of a connectable beverage bottle, according to an embodiment of the invention.
Figure 8B:
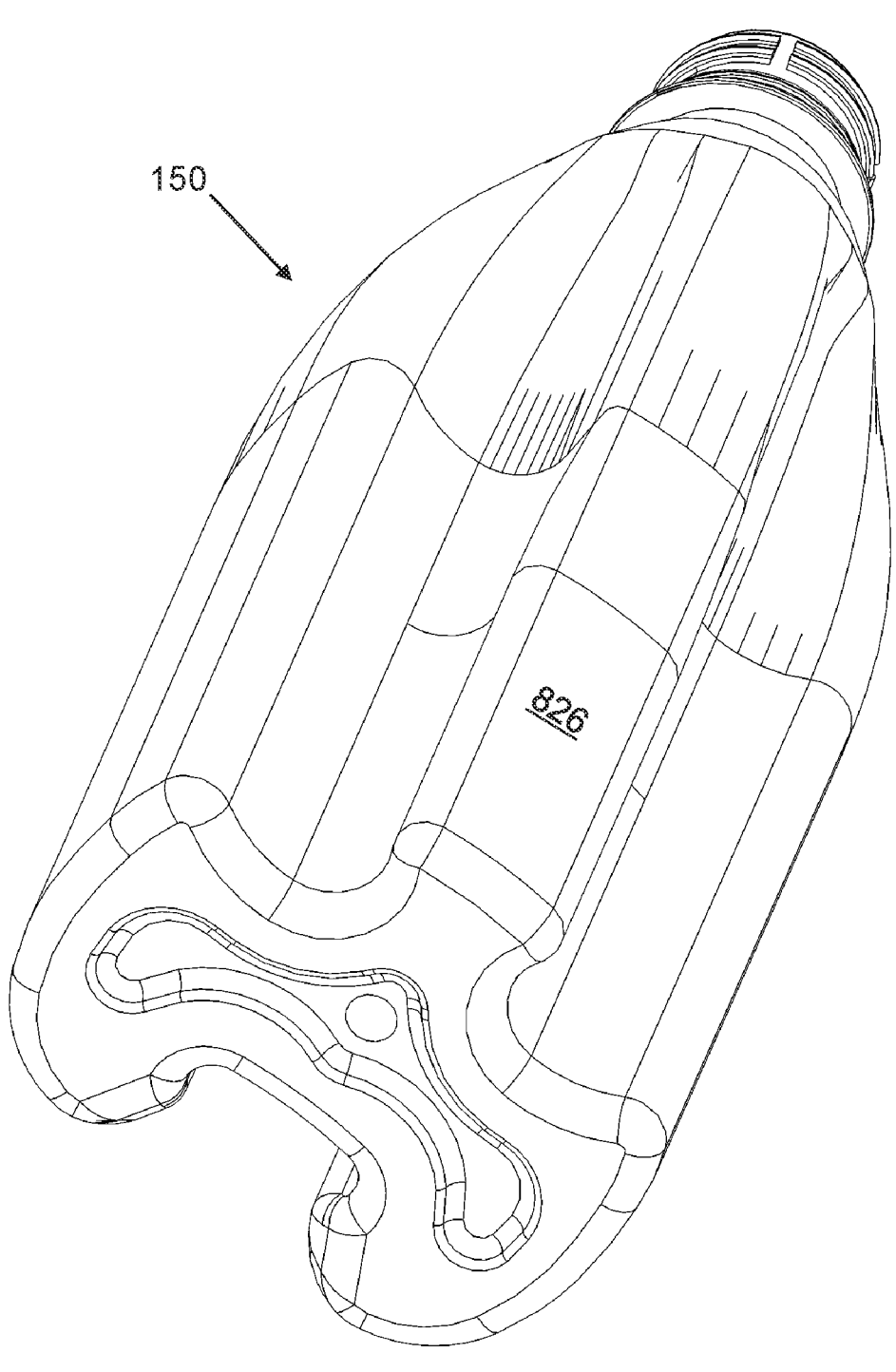
FIG. 8B is a bottom perspective view of a connectable beverage bottle, according to an embodiment of the invention.
Figures 8C, 8D:
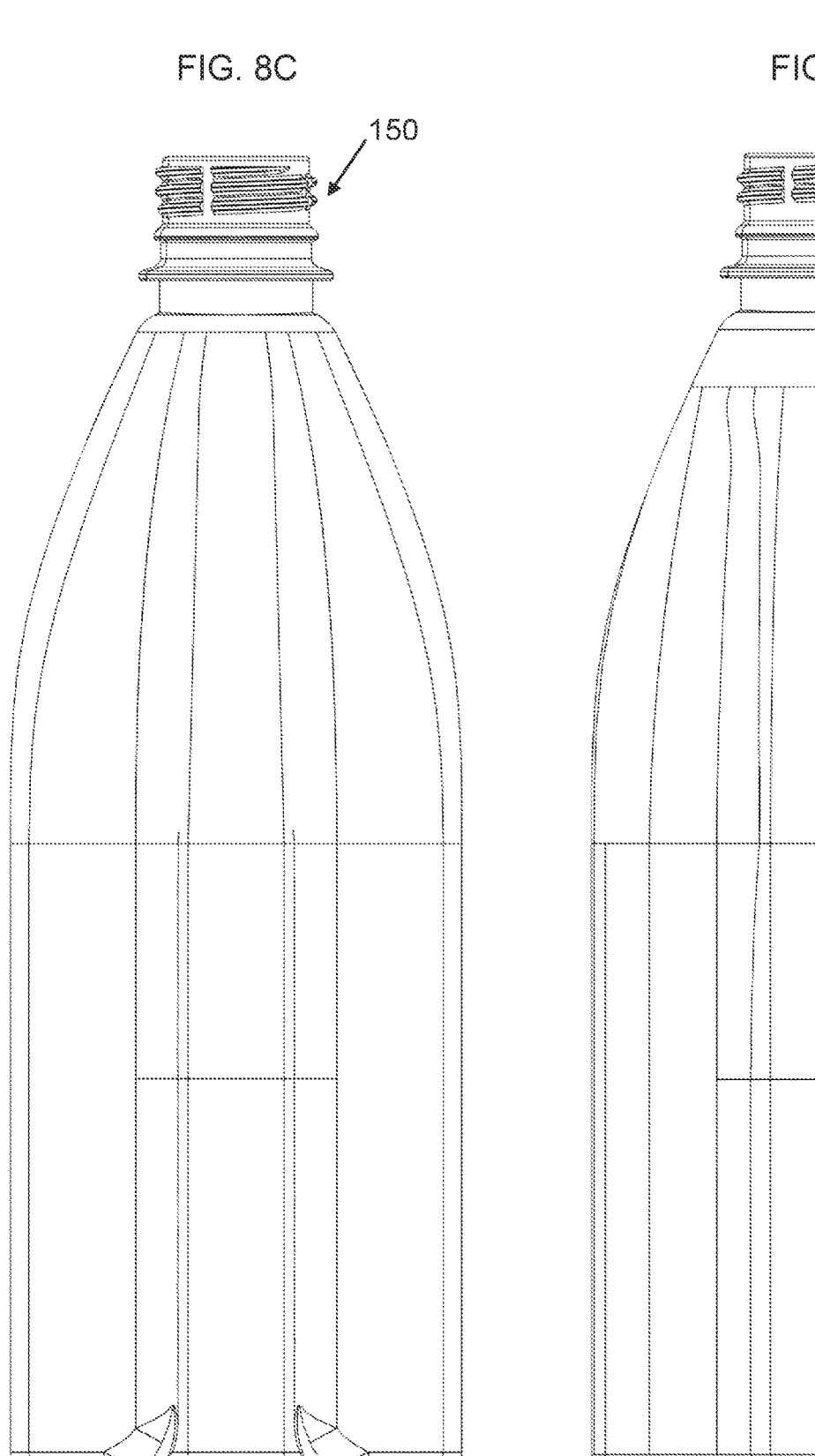
FIG. 8C is a front view of a connectable beverage bottle, according to an embodiment of the invention.
FIG. 8D is a rear view of a connectable beverage bottle, according to an embodiment of the invention.
Figure 8E:
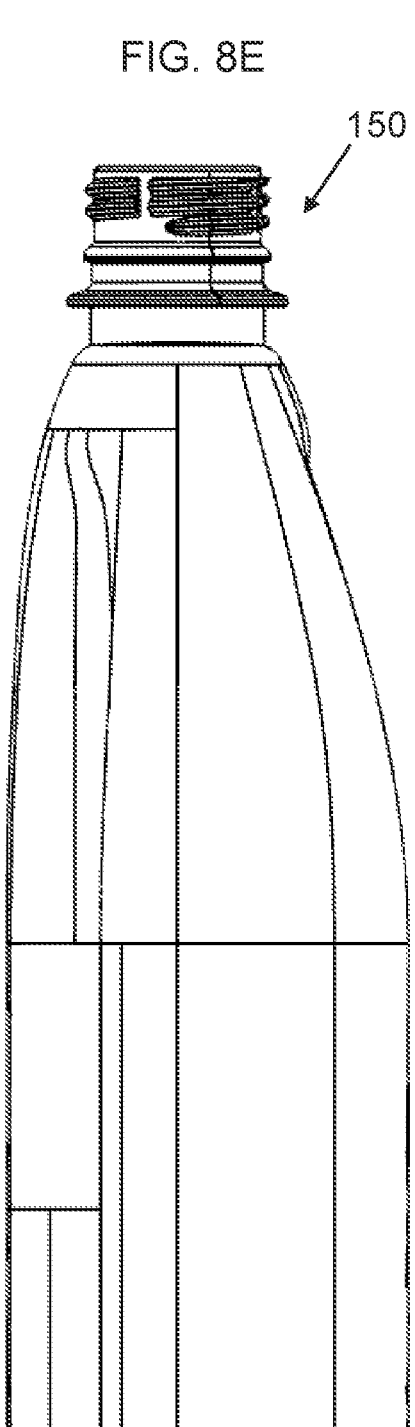
FIG. 8E is a right side view of a connectable beverage bottle, according to an embodiment of the invention.
Figure 8F:
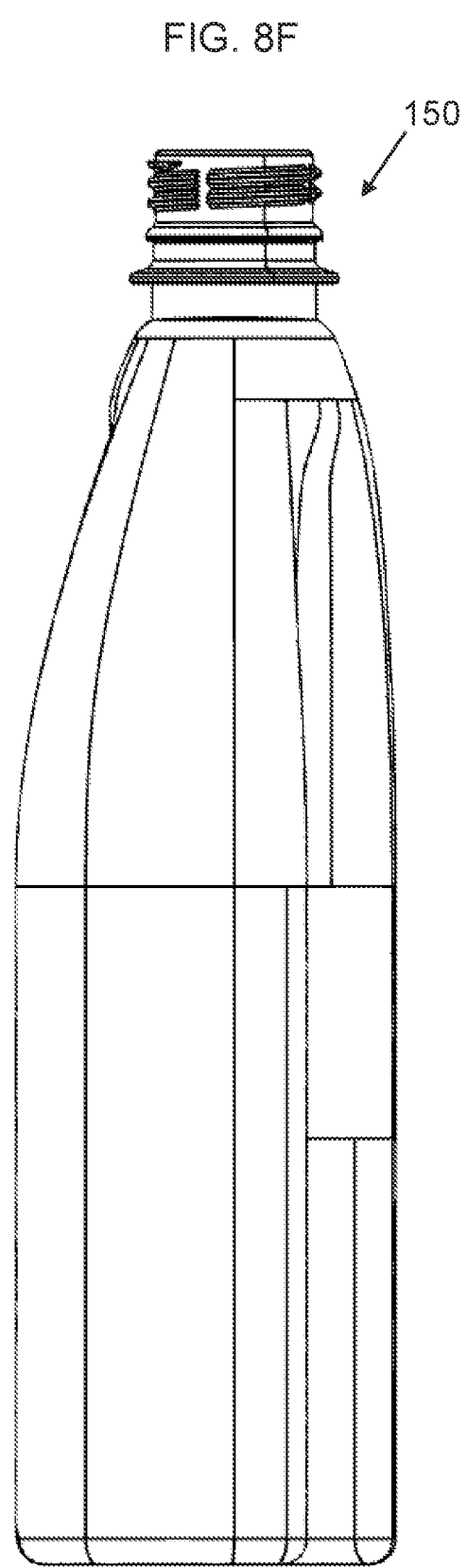
FIG. 8F is a left side view of a connectable beverage bottle, according to an embodiment of the invention.
Figure 8G:
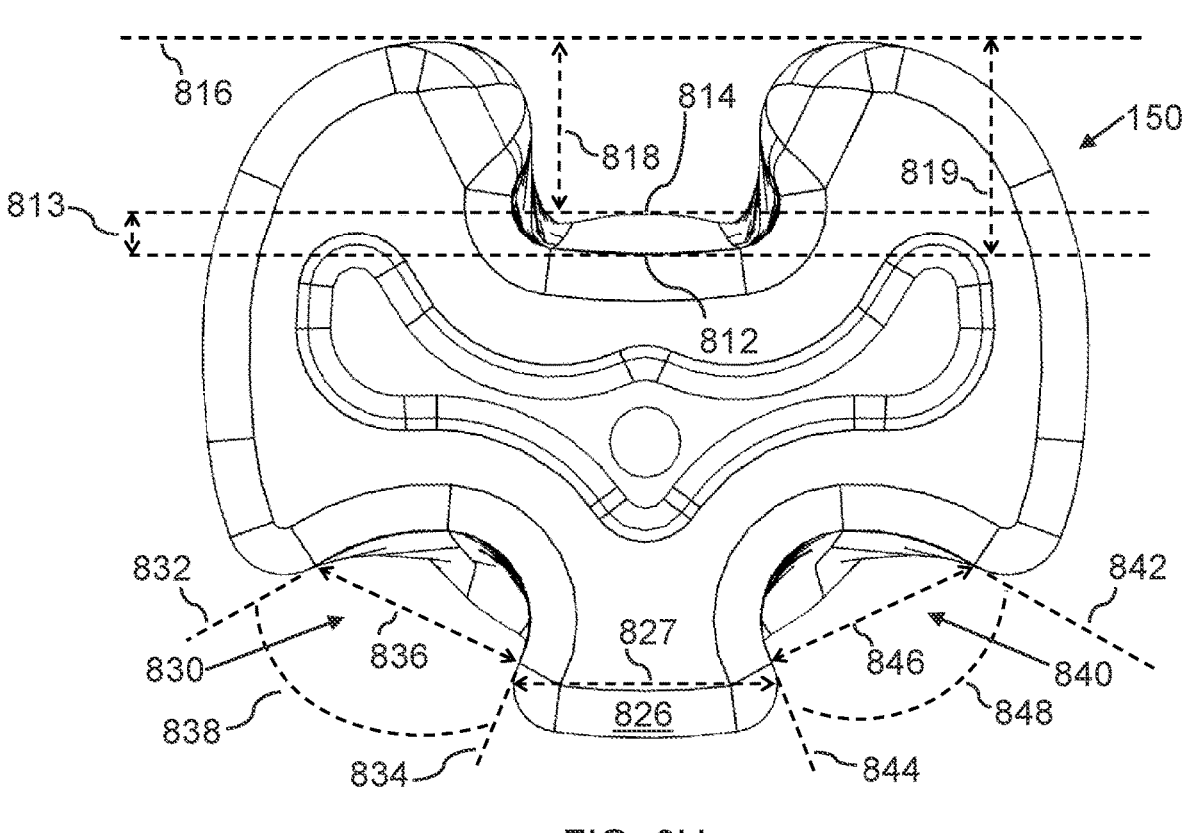
FIG. 8G is a bottom view of a connectable beverage bottle, according to an embodiment of the invention.
Figure 8H:
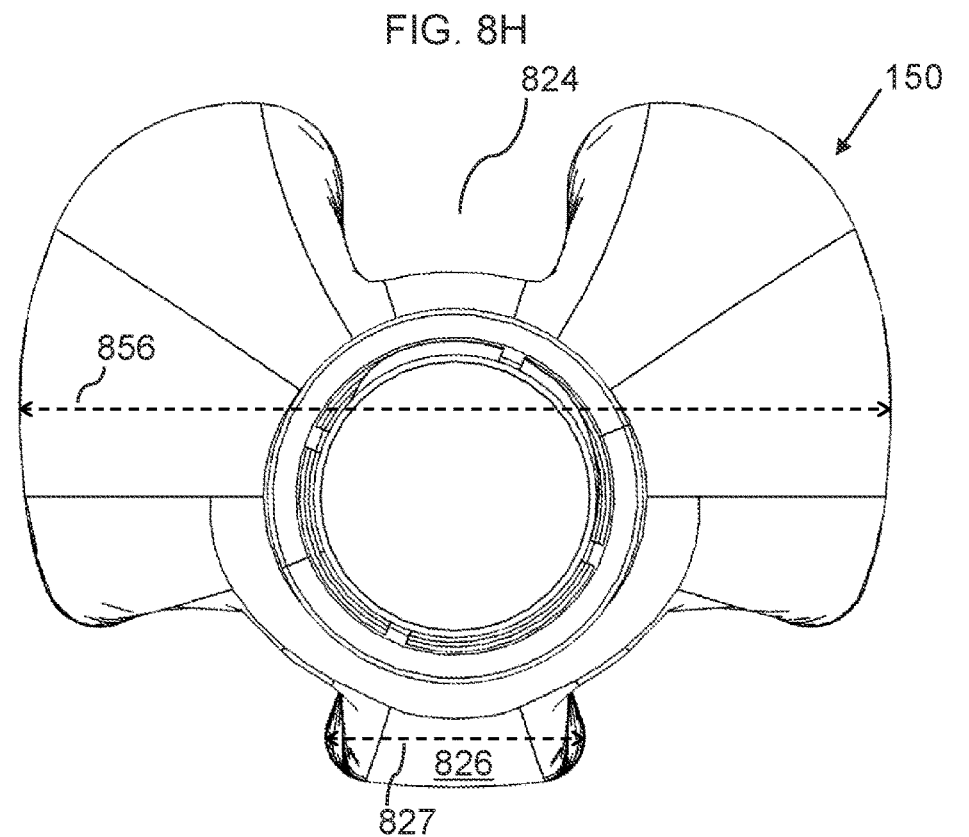
FIG. 8H is a top view of a connectable beverage bottle, according to an embodiment of the invention.
Figure 8I:
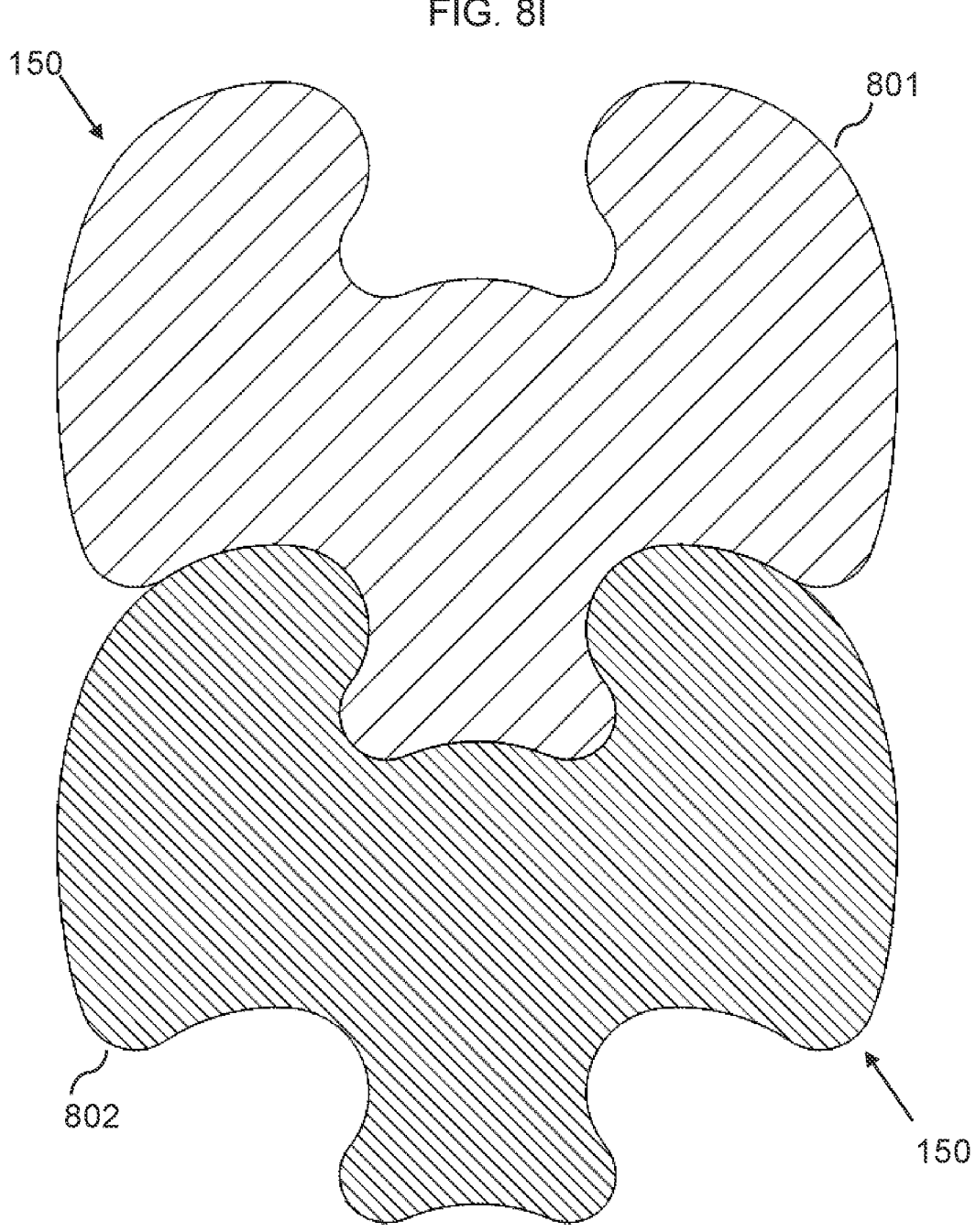
FIG. 8I is a cross-sectional schematic diagram of a first connectable beverage bottle connected with a second connectable beverage bottle, according to an embodiment of the invention.

Note that it is readily apparent that if the lower mold portion 120 was vertically split in two parts as a conventional mold, the two parts of the lower mold portion 120 would not be laterally/horizontally removable, due to the interlocking/connectable shape of the lower portion of the connectable beverage bottle 150, which would hold the two parts in place, similar to the locking configuration shown in FIG. 8I.

In a related embodiment, the penetrating lower central aperture 123 can be configured with a uniform horizontal cross-sectional shape.

In a further related embodiment, the lower central mold portion 122 can be further configured with a vertical mold locking protrusion 524, which protrudes into a vertical front of the penetrating lower central aperture 123, wherein the vertical mold locking protrusion 524 is configured to mold a vertical bottle locking indentation 824 of the lower central portion of the connectable beverage bottle.

In a yet further related embodiment, the lower central mold portion 122 can be further configured with a vertical mold locking indentation 526, which is positioned along a vertical rear of the penetrating lower central aperture 123, wherein the vertical mold locking indentation 526 is configured to mold a vertical bottle locking protrusion 826 of the lower central portion of the connectable beverage bottle 150.

In a related embodiment, thin layers 564, 566 of adhesive (or other types of hardening compounds) can be applied to surfaces of the vertical mold locking protrusion 524 and the vertical mold locking indentation 526, respectively, in order to adjust tolerances of the mold and ensure that the lower central mold portion 122 can easily slide downward and release from the newly molded connectable beverage bottle 150.

Figure 9A:
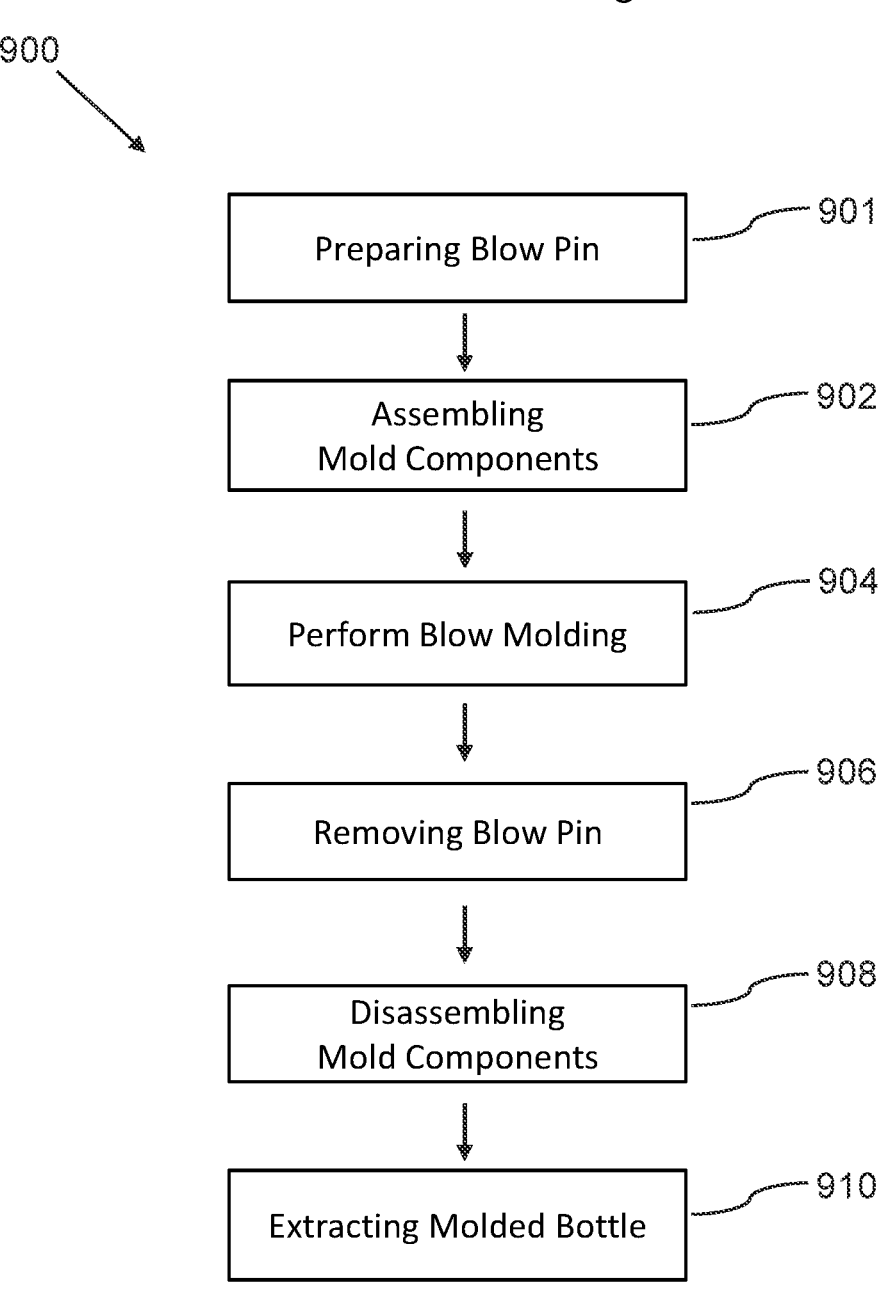
FIG. 9A is a flowchart illustrating steps that may be followed, in accordance with one embodiment of a method or process of molding using the system for molding.
Figure 9B:
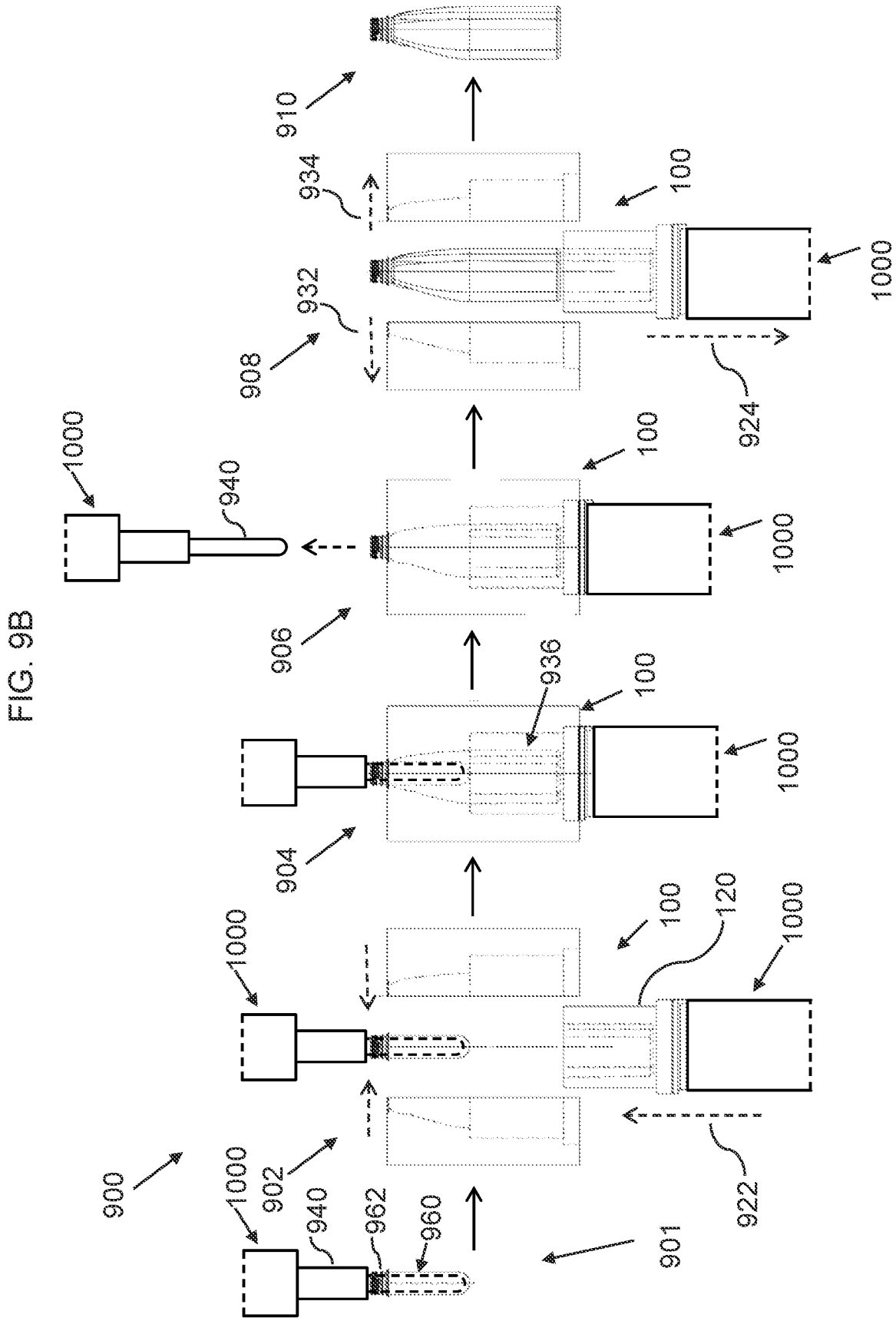
FIG. 9B is a schematic diagram illustrating steps that may be followed, in accordance with one embodiment of a method or process of molding using the system for molding.

In a related embodiment, as shown in FIGS. 1A and 9B, the left upper mold portion 112 can further include:

a) a left receiving indentation 133, which is positioned below the left upper molding cavity 113, wherein the left receiving indentation 133 is configured to receive a left side of the lower central mold portion 122; and wherein the right upper mold portion 114 can further include:

b) a right receiving indentation 135, which is positioned below the right upper molding cavity, wherein the right receiving indentation 135 is configured to receive a right side of the lower central mold portion 122;

such that, when the left upper mold portion 112 and the right upper mold portion 114 are positioned side by side, the left receiving indentation 133 and the right receiving indentation 135 form a combined receiving cavity 936, which is configured to receive the lower central mold portion 122.

In a further related embodiment, each of the left receiving indentation 133 and the right receiving indentation 135 can be configured as a half cylinder, such that the combined receiving cavity 936 is cylindrical; and wherein an outer vertical surface of the lower central mold portion 122 is cylindrical.

Figure 1B:
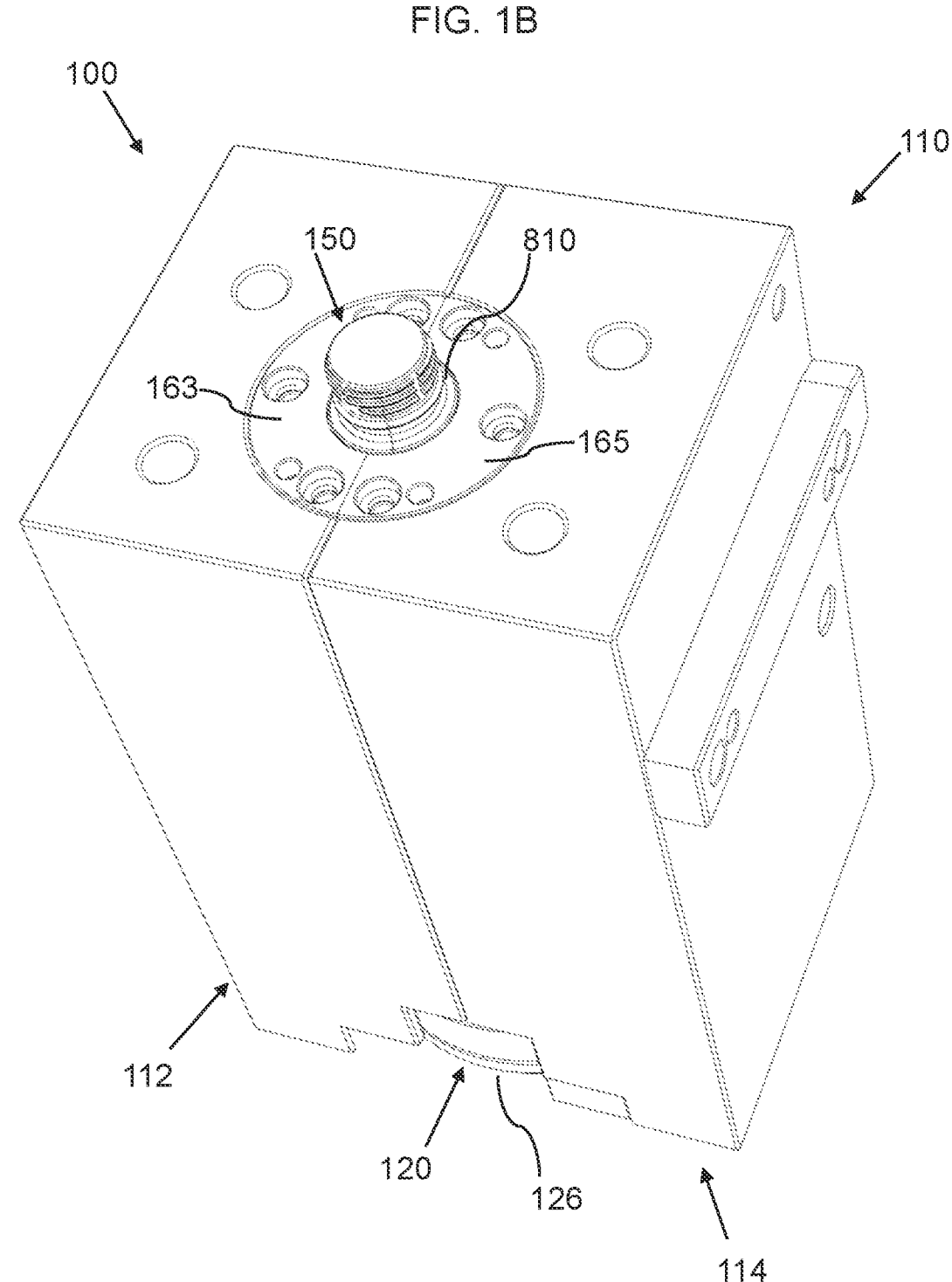
FIG. 1B is a top perspective view of a system for molding in an assembled configuration, according to an embodiment of the invention.
Figure 1C:
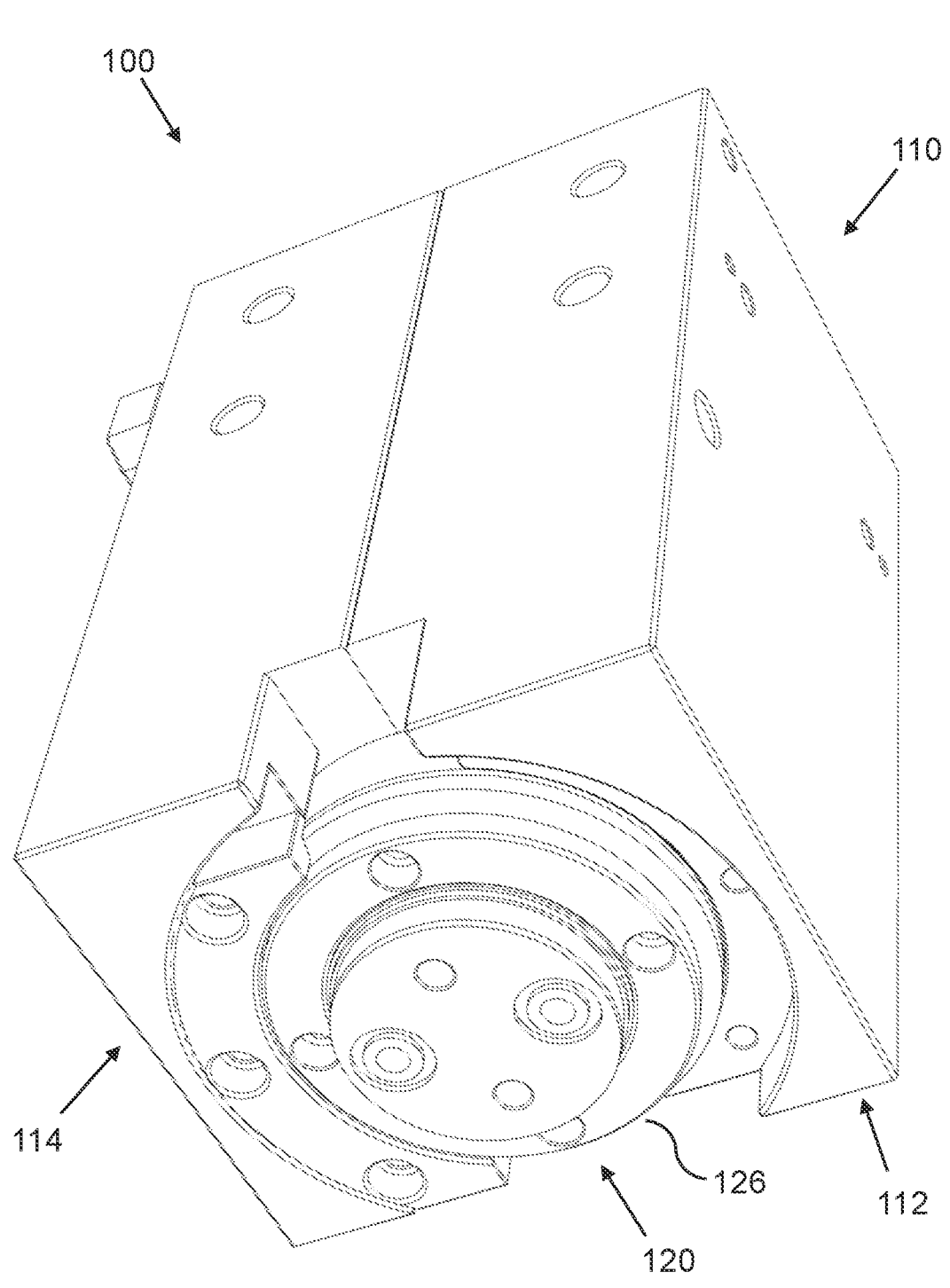
FIG. 1C is a bottom perspective view of a system for molding in an assembled configuration, according to an embodiment of the invention.
Figure 1E:
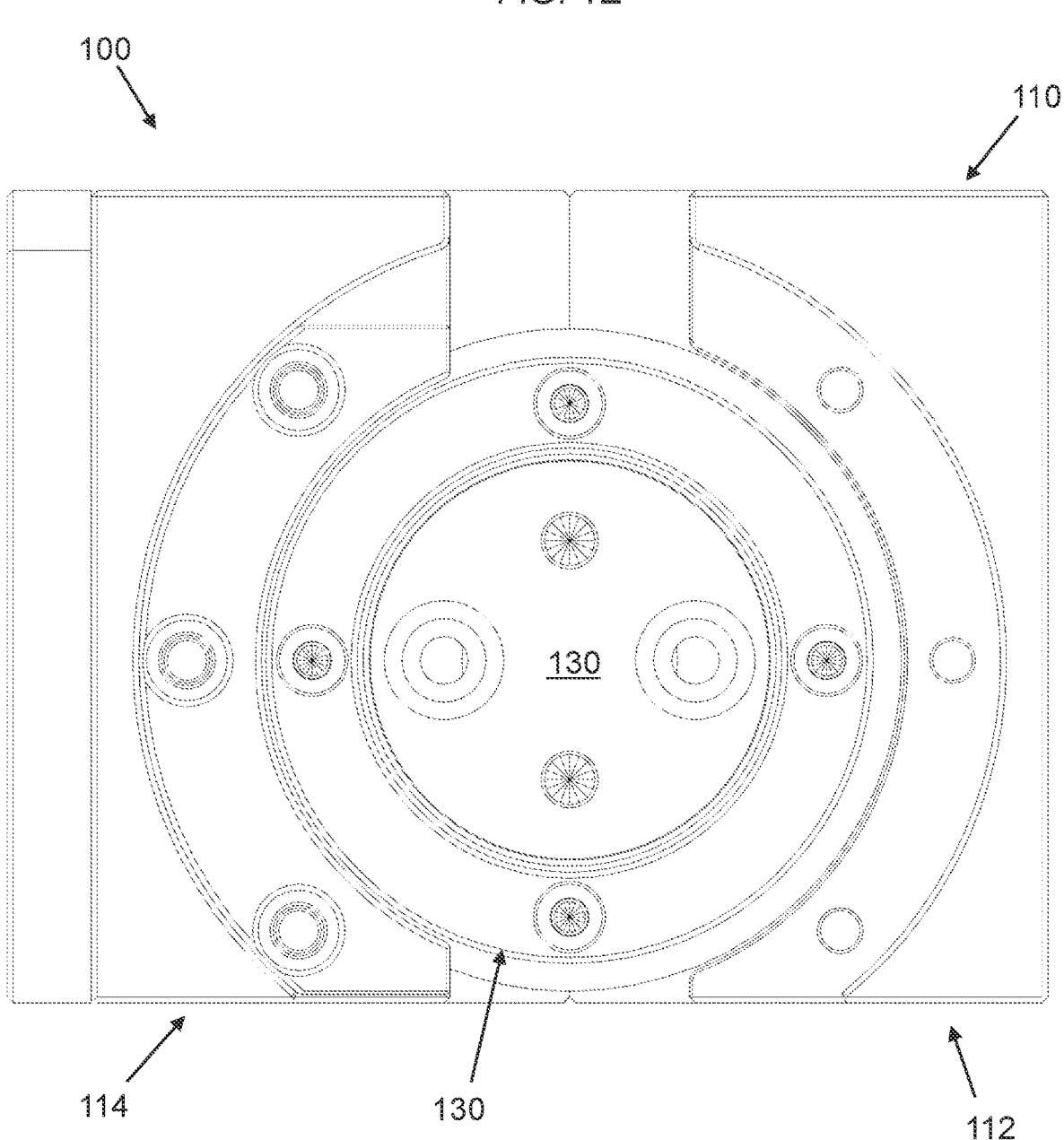
FIG. 1E is a bottom plan view of a system for molding in an assembled configuration, according to an embodiment of the invention.
Figure 1F:
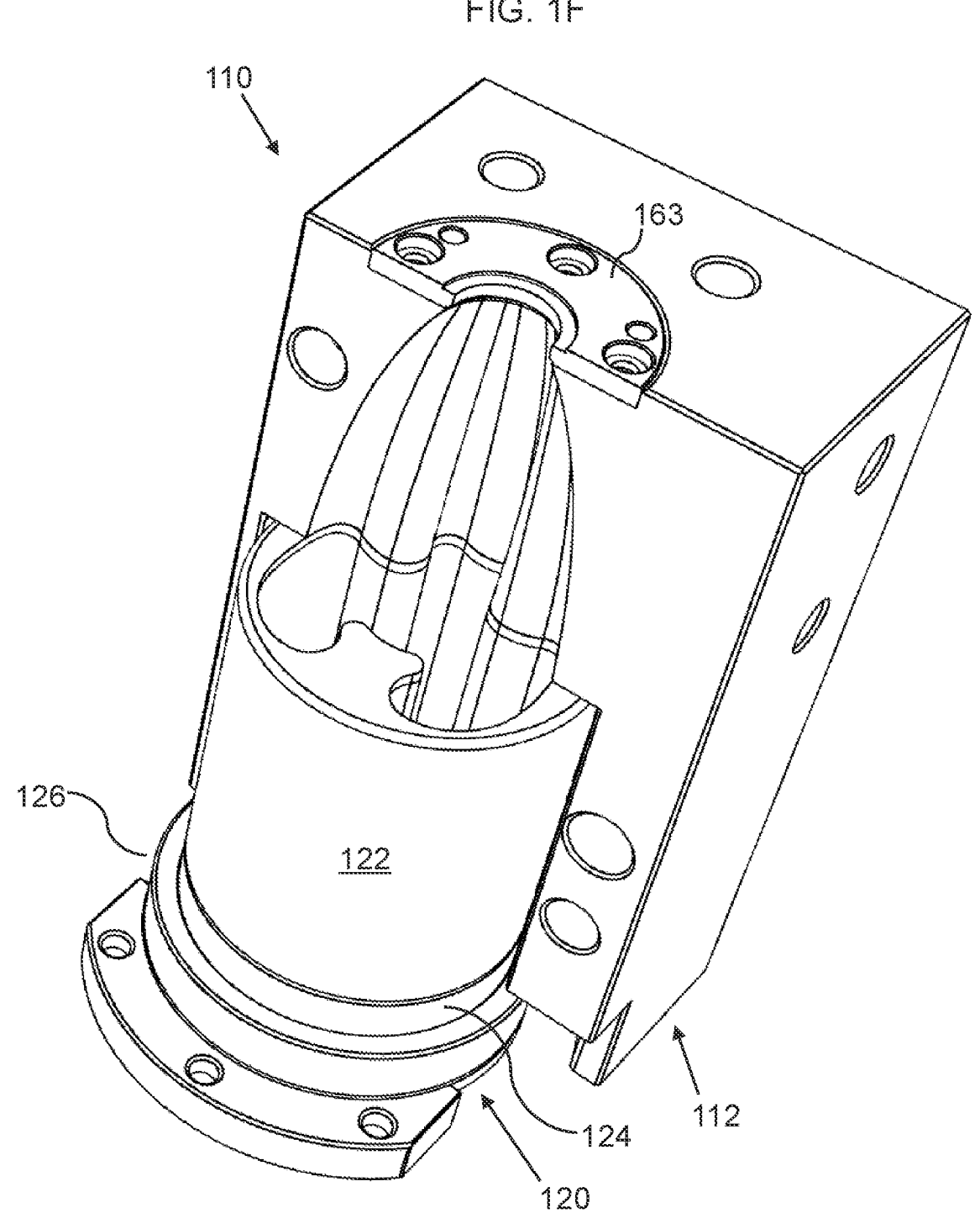
FIG. 1F is a top perspective view of a system for molding in a partially assembled configuration, according to an embodiment of the invention.
Figure 1G:
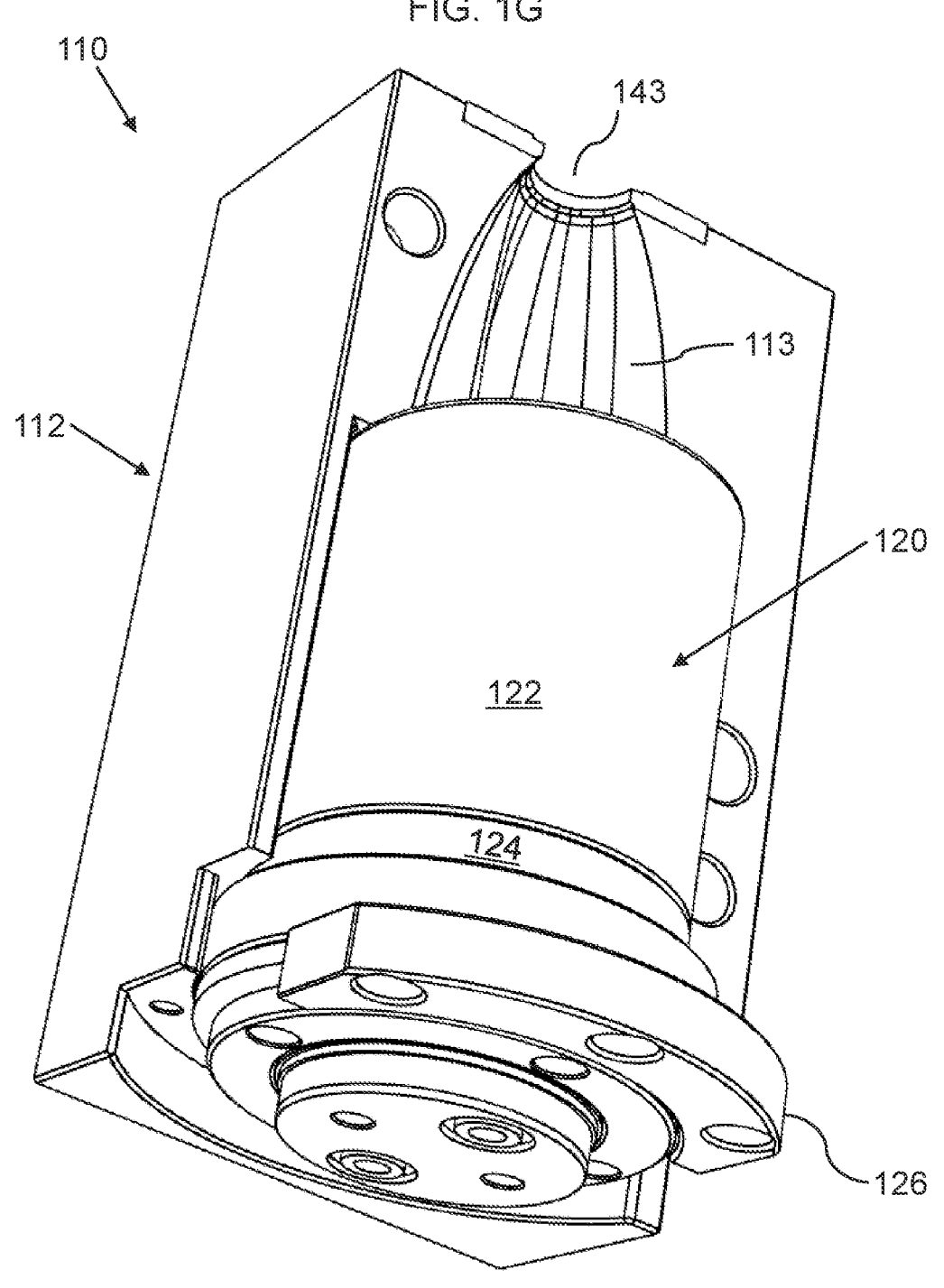
FIG. 1G is a bottom perspective view of a system for molding in a partially assembled configuration, according to an embodiment of the invention.
Figure 2A:
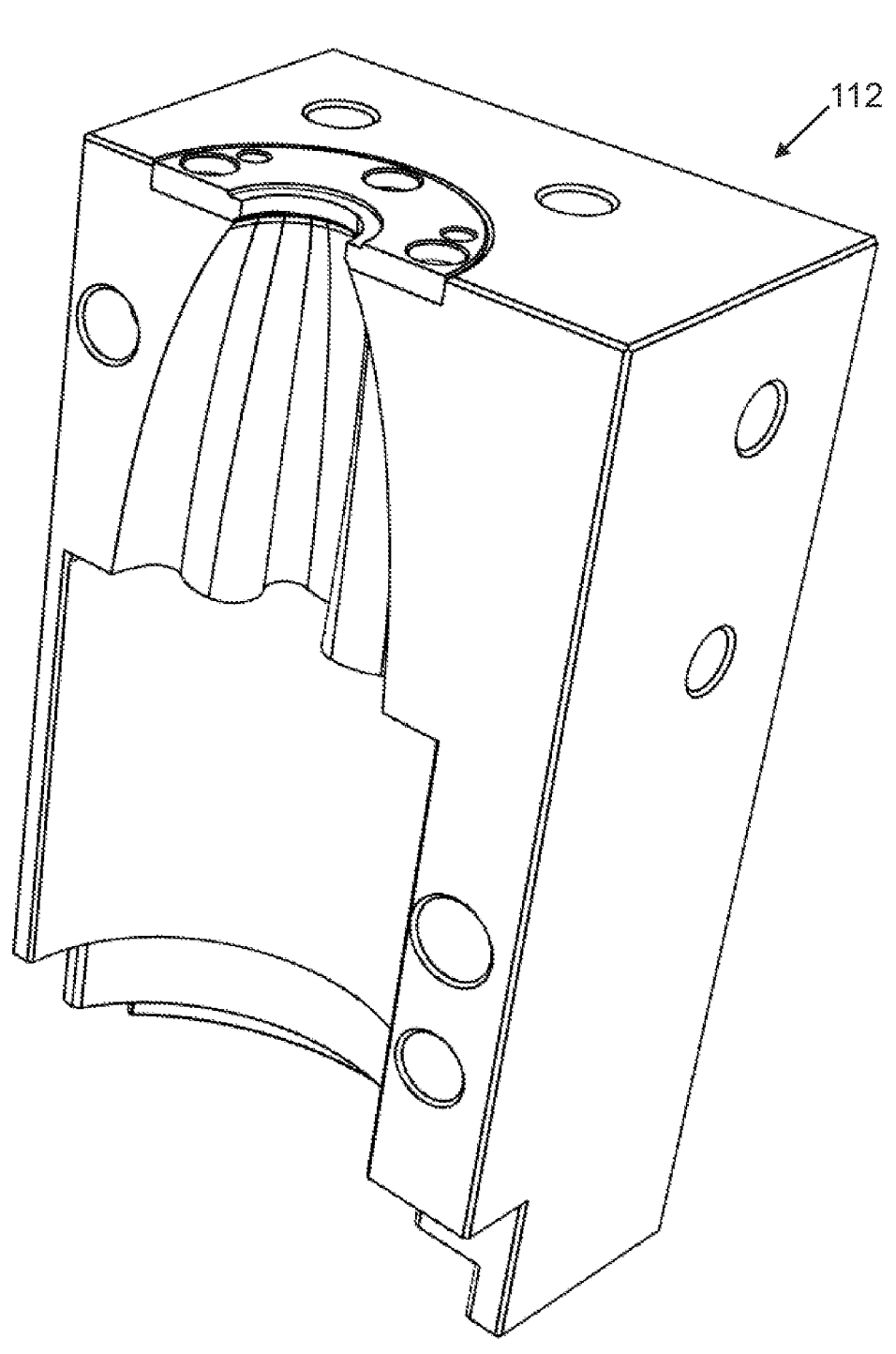
FIG. 2A is a front top perspective view of a left side upper mold portion, according to an embodiment of the invention.
Figure 2B:
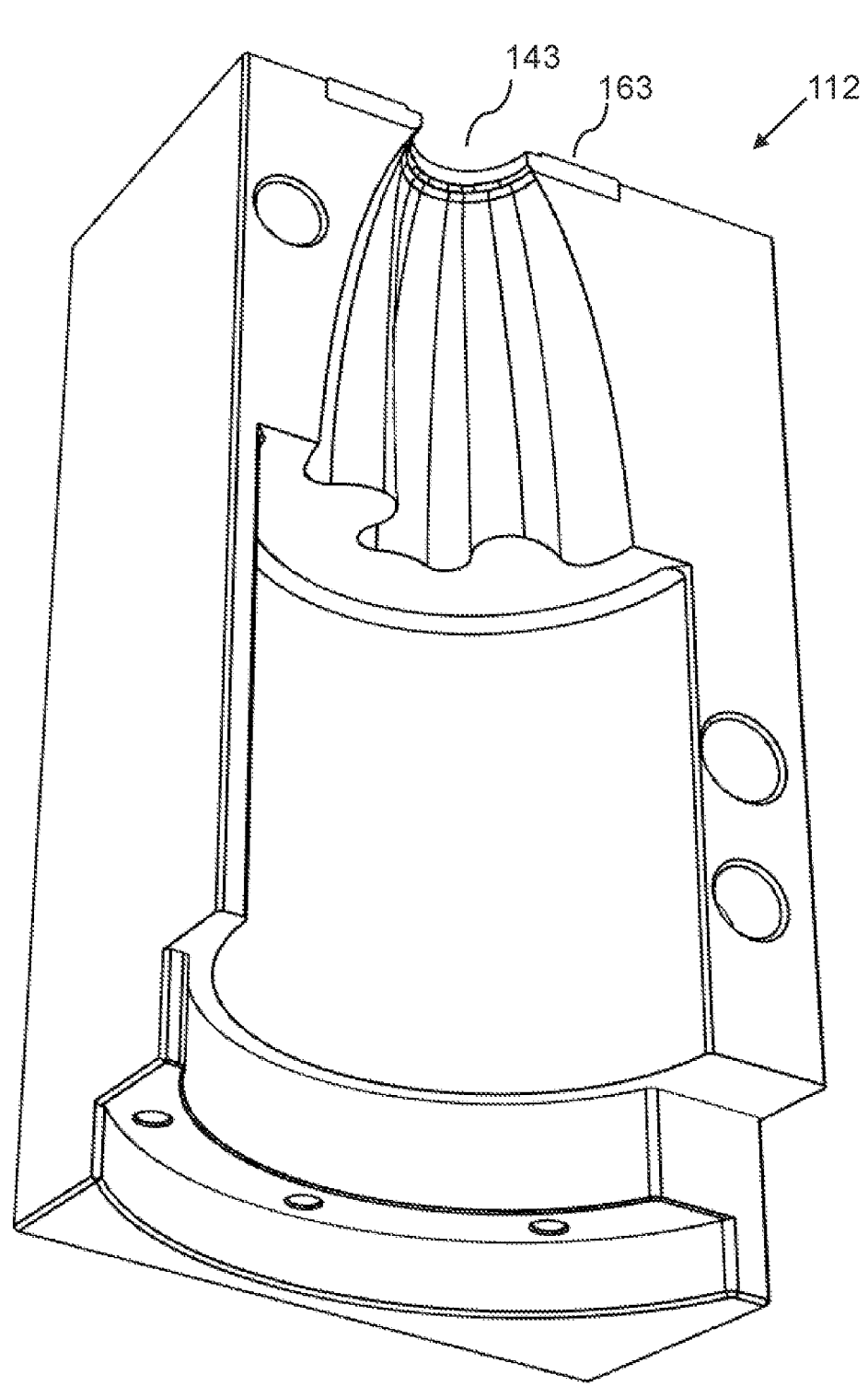
FIG. 2B is a rear bottom perspective view of a left side upper mold portion, according to an embodiment of the invention.
Figure 2C:
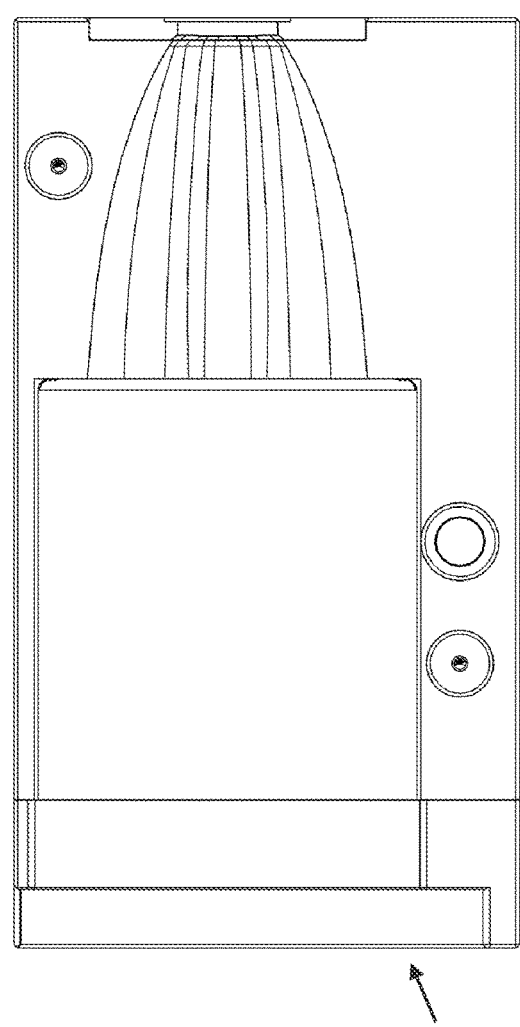
FIG. 2C is a right side elevational view of a left side upper mold portion, according to an embodiment of the invention.
Figure 2D:
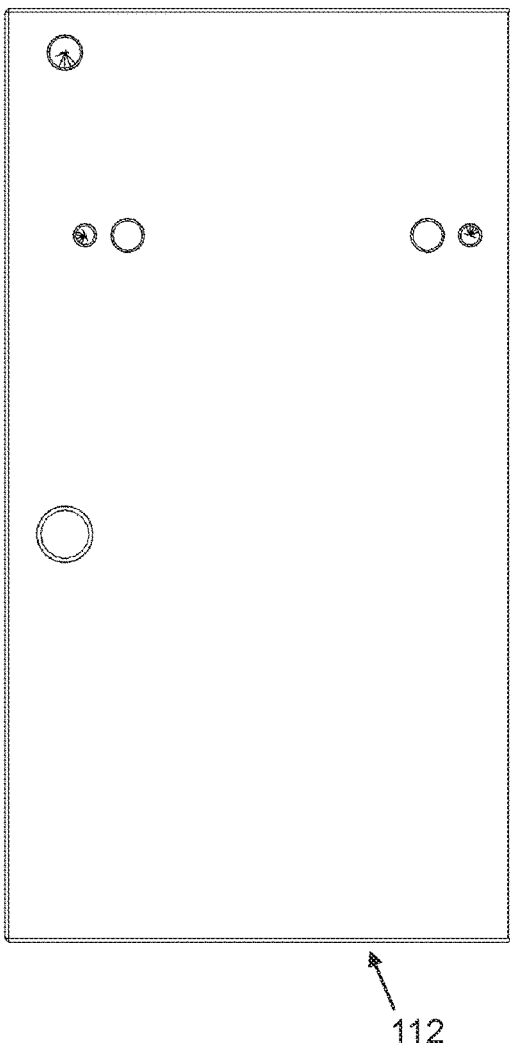
FIG. 2D is a left side elevational view of a left side upper mold portion, according to an embodiment of the invention.
Figure 2E:
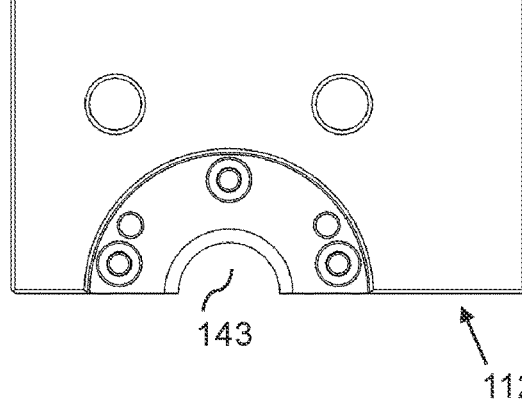
FIG. 2E is a top plan view of a left side upper mold portion, according to an embodiment of the invention.
Figure 2F:
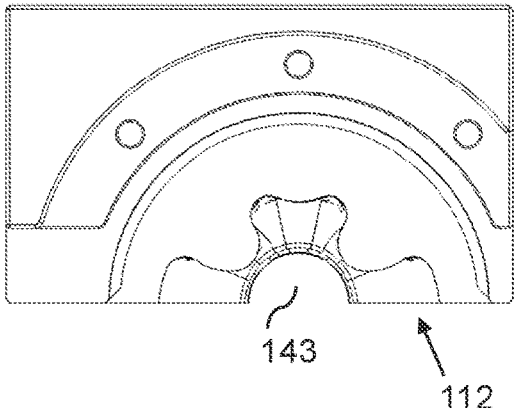
FIG. 2F is a bottom plan view of a left side upper mold portion, according to an embodiment of the invention.
Figure 3A:
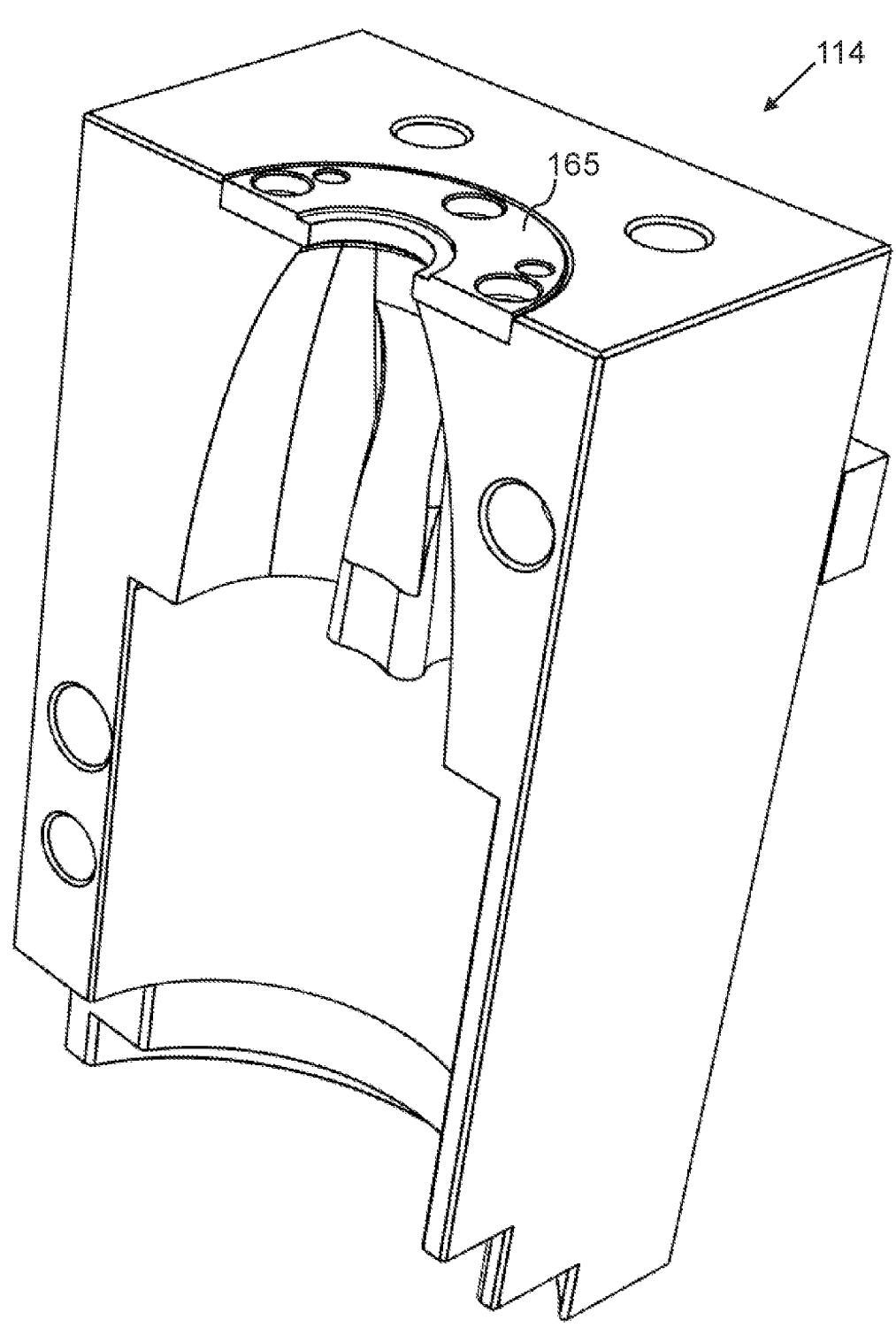
FIG. 3A is a rear top perspective view of a right side upper mold portion, according to an embodiment of the invention.
Figure 3B:
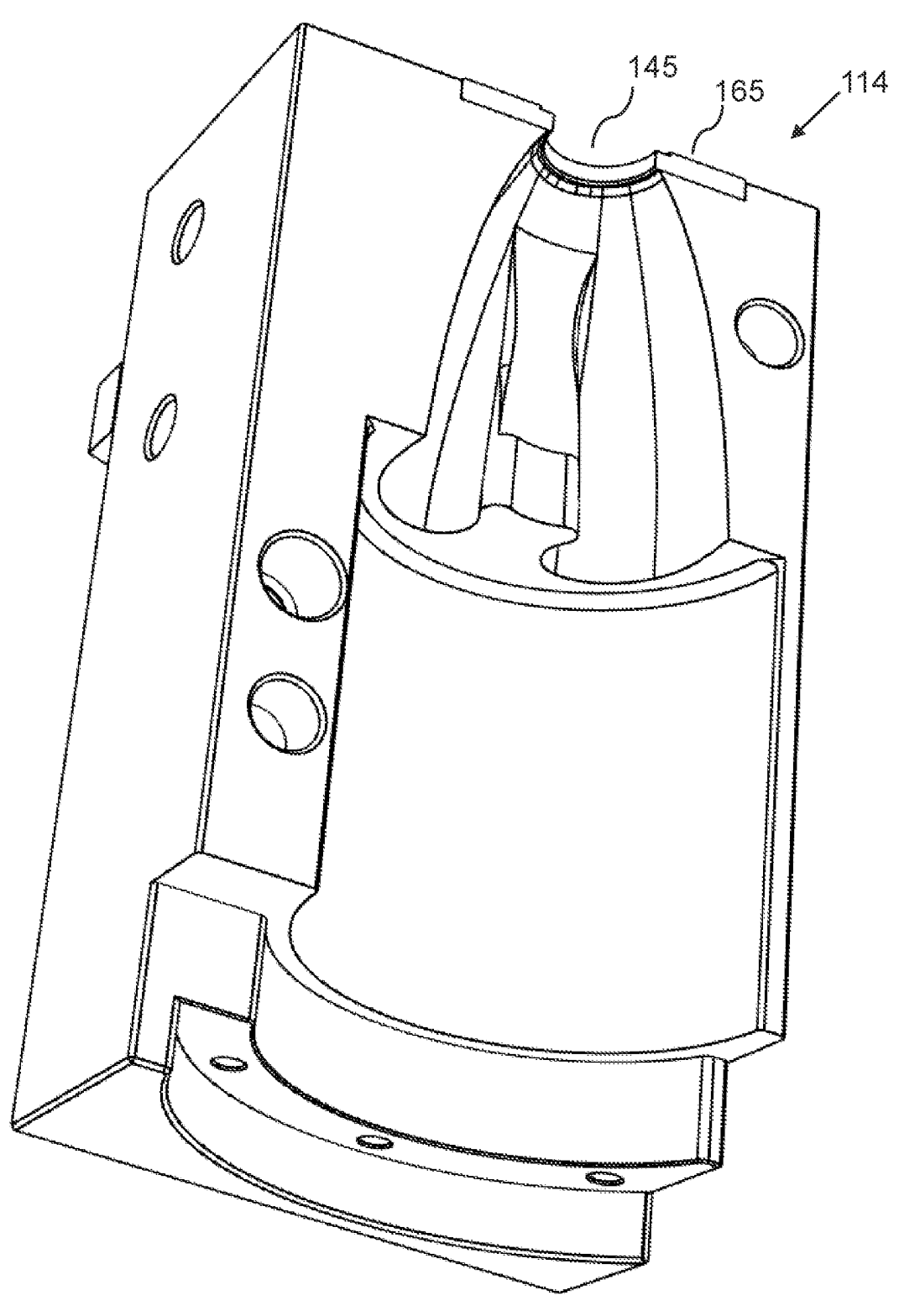
FIG. 3B is a front bottom perspective view of a right side upper mold portion, according to an embodiment of the invention.
Figure 3C:
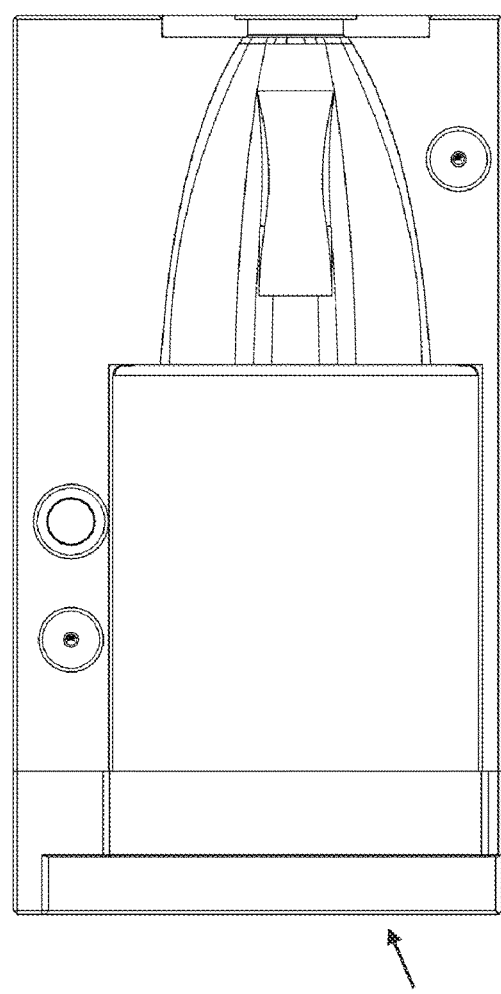
FIG. 3C is a left side elevational view of a right side upper mold portion, according to an embodiment of the invention.
Figure 3D:
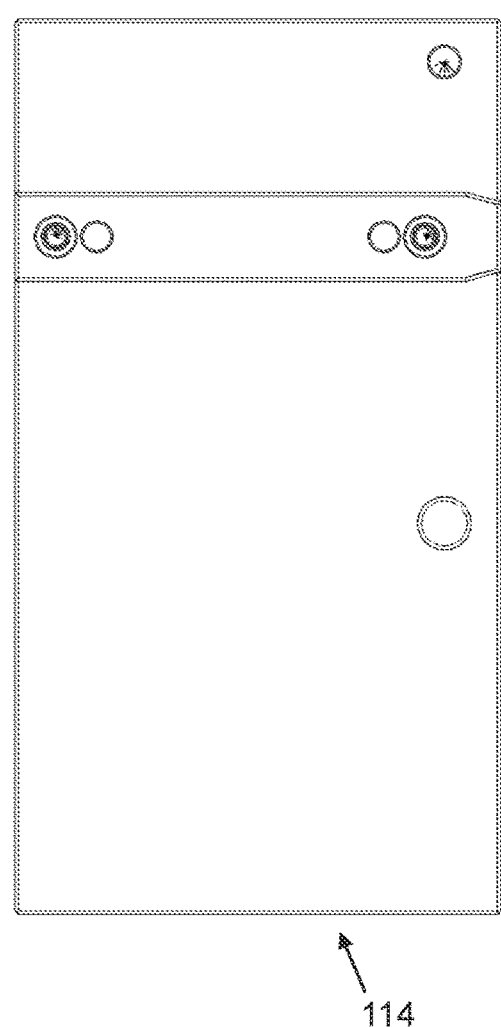
FIG. 3D is a right side elevational view of a right side upper mold portion, according to an embodiment of the invention.
Figure 3E:
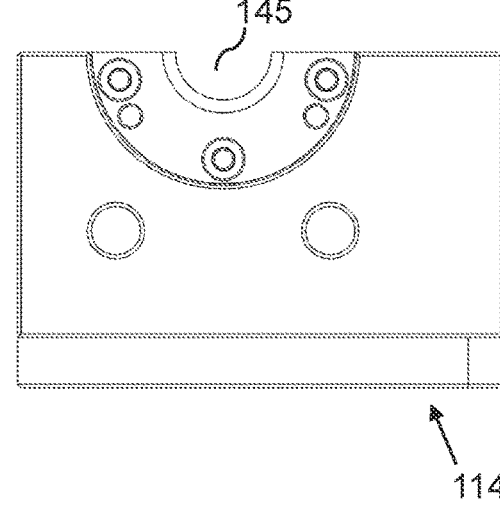
FIG. 3E is a top plan view of a right side upper mold portion, according to an embodiment of the invention.
Figure 3F:
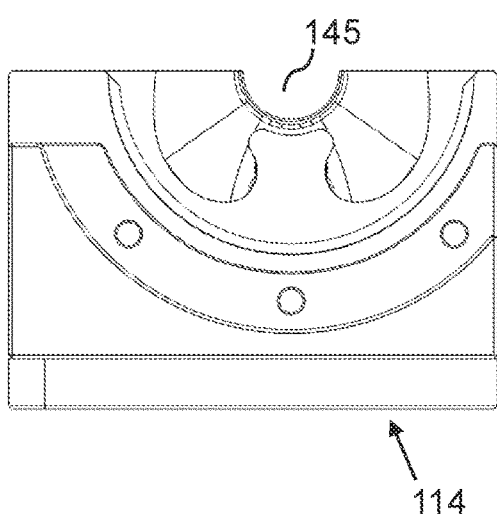
FIG. 3F is a bottom plan view of a right side upper mold portion, according to an embodiment of the invention.
Figure 4A:
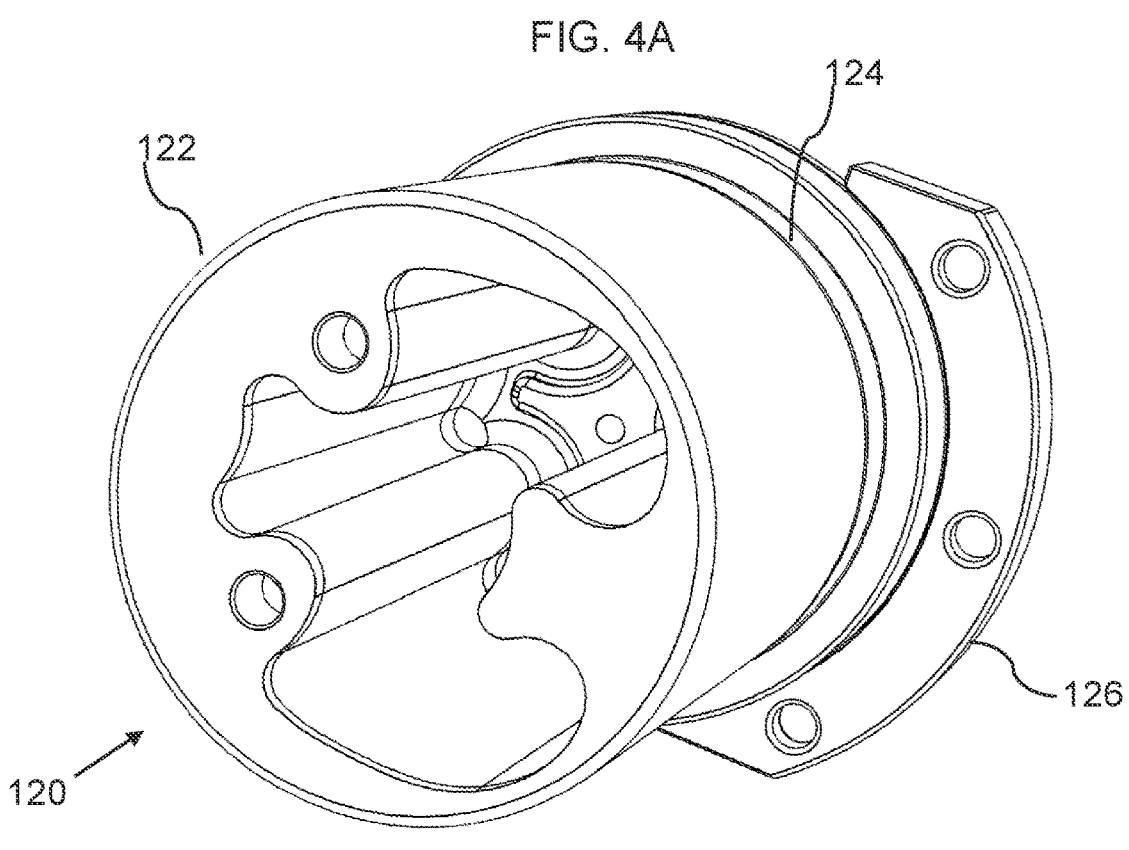
FIG. 4A is a front top perspective view of a lower mold portion, according to an embodiment of the invention.
Figure 4B:
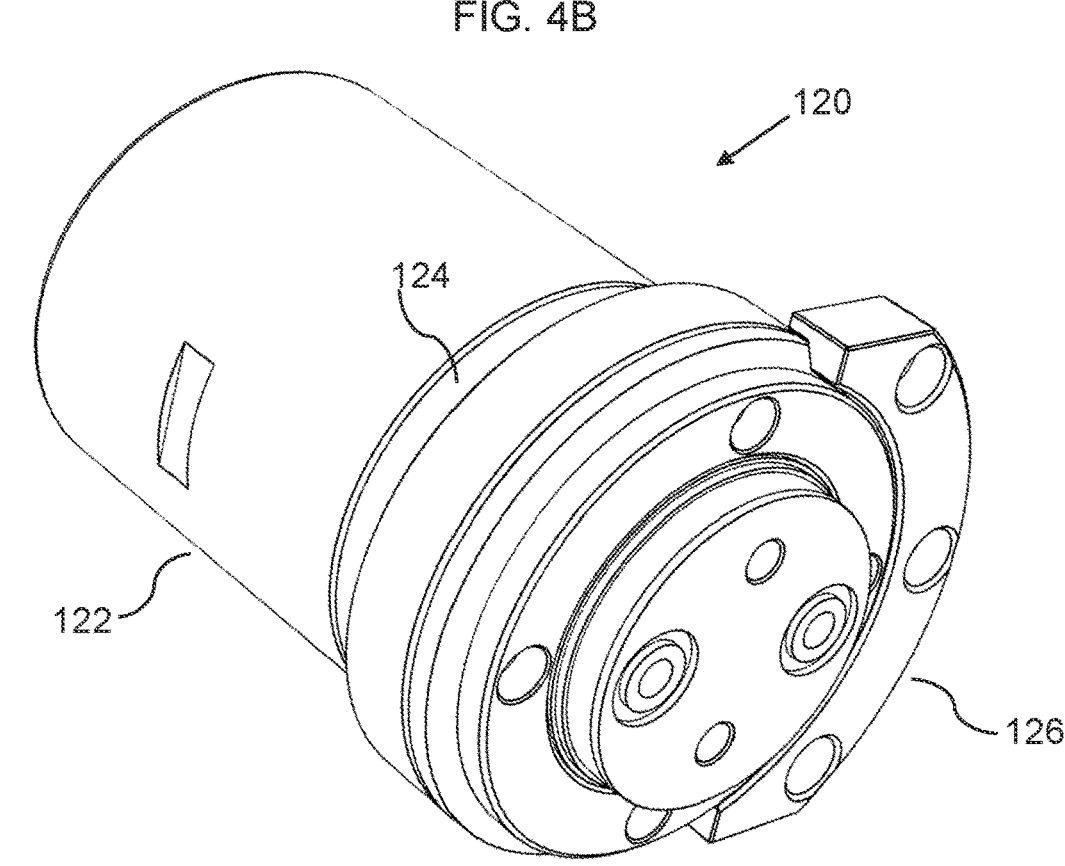
FIG. 4B is a rear bottom perspective view of a lower mold portion, according to an embodiment of the invention.
Figures 4C, 4D:
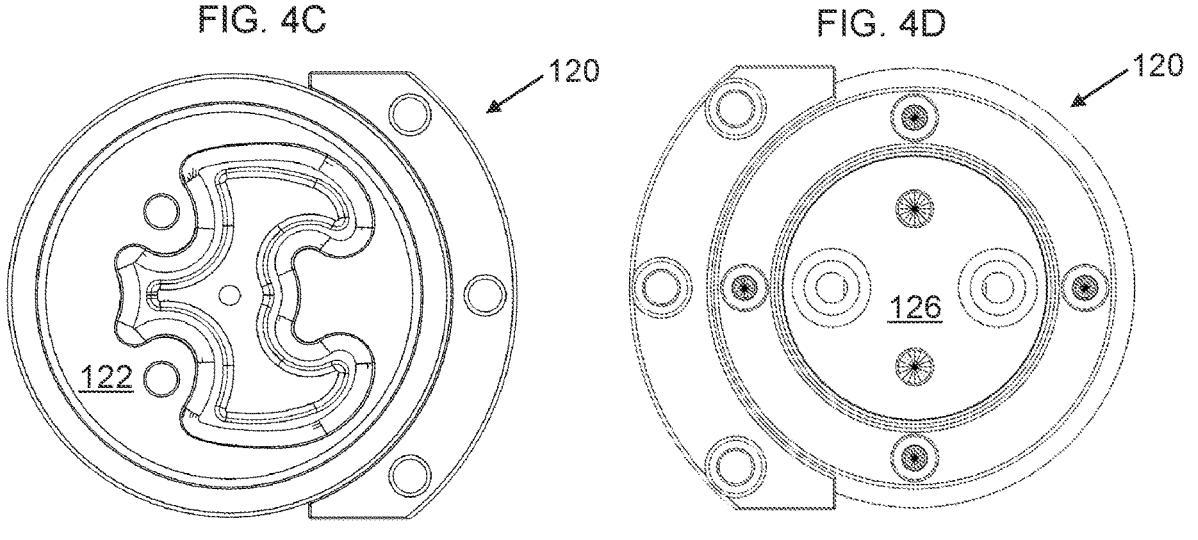
FIG. 4C is a top plan view of a lower mold portion, according to an embodiment of the invention.
FIG. 4D is a bottom plan view of a lower mold portion, according to an embodiment of the invention.
Figures 4E, 4F:
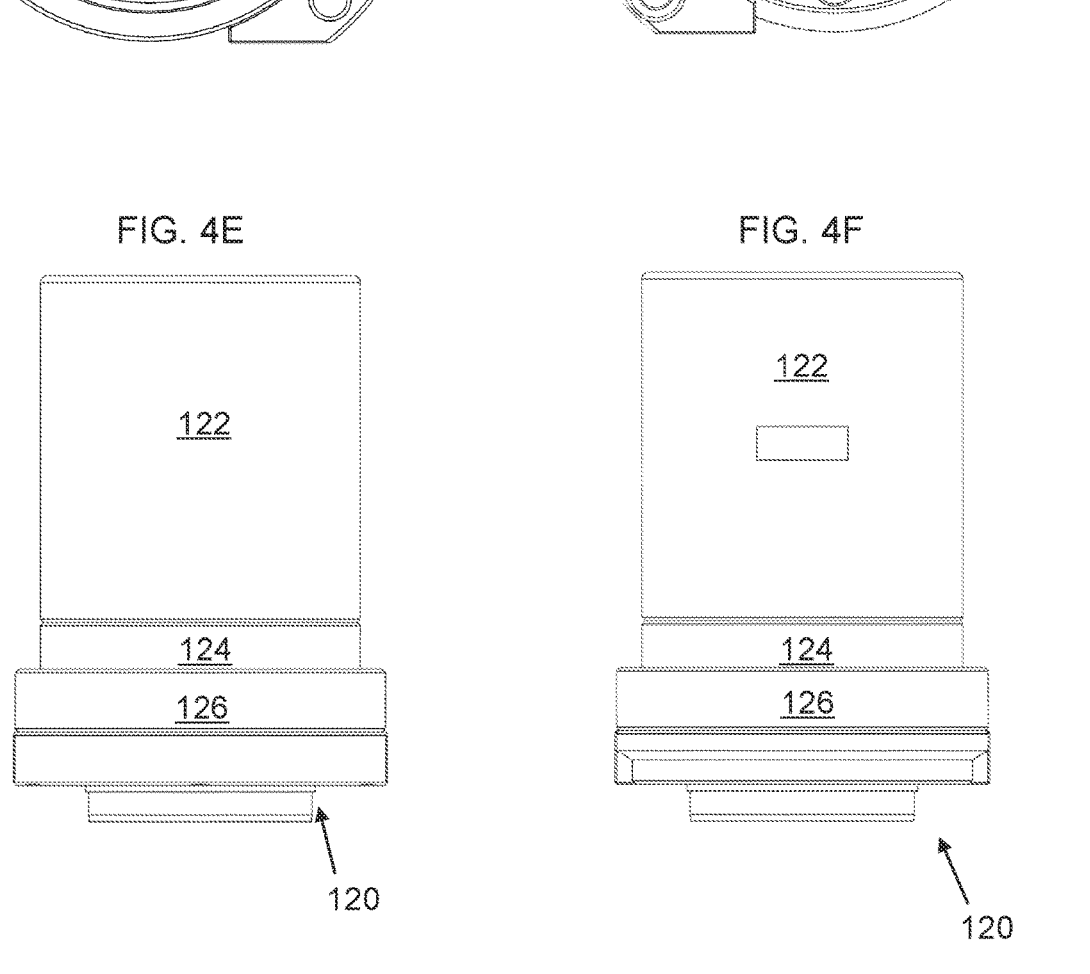
FIG. 4E is a front elevation view of a lower mold portion, according to an embodiment of the invention.
FIG. 4F is a rear elevation view of a lower mold portion, according to an embodiment of the invention.
Figures 5A, 5B, 5C, 5D:
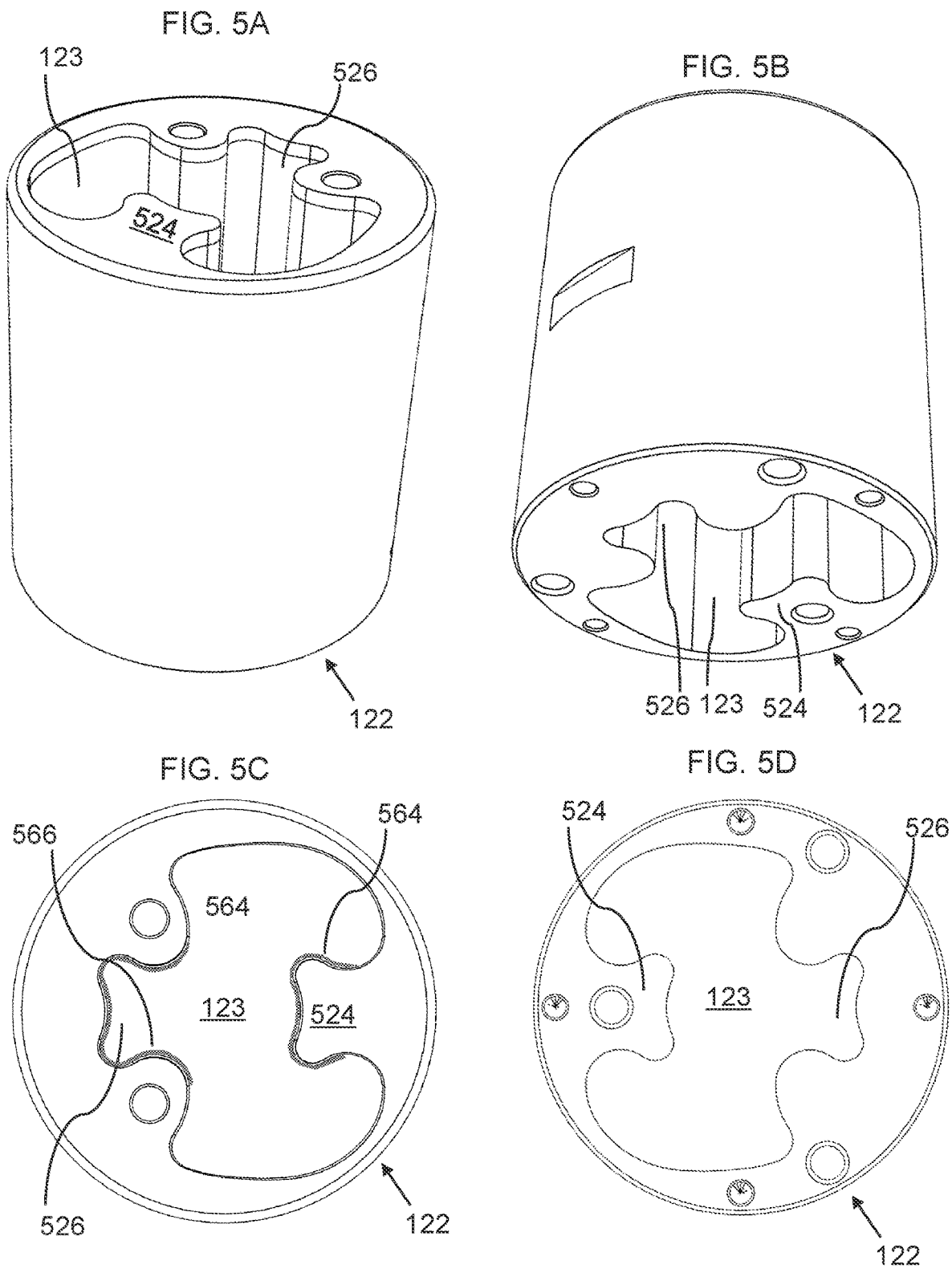
FIG. 5A is a front top perspective view of a lower central mold portion, according to an embodiment of the invention.
FIG. 5B is a rear bottom perspective view of a lower central mold portion, according to an embodiment of the invention.
FIG. 5C is a top plan view of a lower central mold portion, according to an embodiment of the invention.
FIG. 5D is a bottom plan view of a lower central mold portion, according to an embodiment of the invention.

In a related embodiment, the left upper mold portion 112 can further include:

a) an upper left penetrating indentation 143, as shown in FIGS. 1G and 2B, which is positioned in a left inner side of a left top surface of the left upper mold portion 112, such that the upper left penetrating indentation 143 penetrates from the left top surface of the left upper mold portion 112 to the left upper molding cavity 113; and wherein the right upper mold portion 114 can further include:

b) an upper right penetrating indentation 145, as shown in FIG. 3B, which is positioned in a right inner side of a right top surface of the right upper mold portion 114, such that the upper right penetrating indentation 145 penetrates from the right top surface of the right upper mold portion 114 to the right upper molding cavity 115;

such that, when the left upper mold portion 112 and the right upper mold portion 114 are positioned side by side, the upper left penetrating indentation 143 and the upper right penetrating indentation 145 form a combined upper penetrating aperture 147, which penetrates from a combined top surface of the molding device to the combined upper molding cavity 1015.

Figure 1H:
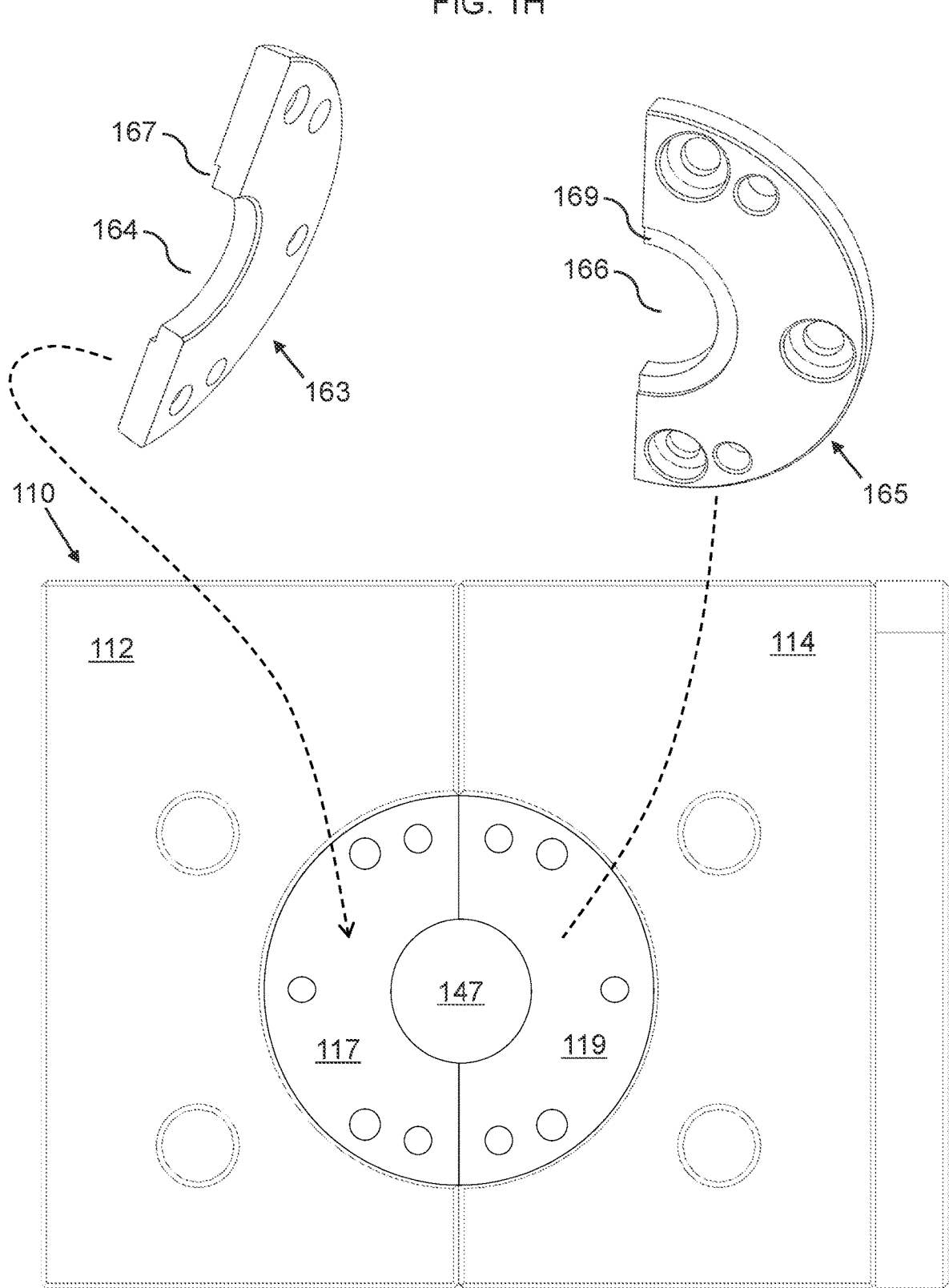
FIG. 1H is a top perspective view of a system for molding in a partially disassembled configuration with detached left and right removable half-segments, according to an embodiment of the invention.

In a further related embodiment, the molding device 110 can further include:

a) a left removable half-segment 163, which can include a left half opening 164; and b) a right removable half-segment 165, which can include a right half opening 166;

wherein the left upper mold portion 112, as shown in FIG. 1H, can further include:

i. an upper left surface indentation 117, as shown in FIG. 1H, which is positioned in the left top surface of the left upper mold portion 112, such that the upper left surface indentation 117 is configured to form a left ledge along the upper left penetrating aperture (along a top opening to the left upper molding cavity 113);

such that the left removable half-segment 163 is configured to be removably positioned in the upper left surface indentation 117; and wherein the right upper mold portion can further include:

ii. an upper right surface indentation 119, which is positioned in the right top surface of the right upper mold portion 114, such that the upper right surface indentation 119 is configured to form a right ledge along the upper right penetrating aperture;

such that the right removable half-segment 165 is configured to be removably positioned in the upper right surface indentation 119;

such that, when the left upper mold portion 112 and the right upper mold portion 114 are positioned side by side with the left removable half-segment 163 positioned in the upper left surface indentation and the right removable half-segment 165 positioned in the upper right surface indentation:

the left half opening 164 and the right half opening 166 form a combined segment opening 168, which is aligned with the combined upper penetrating aperture;

such that the removable half-segments 163, 165 positioned in respectively the left and right upper mold portions 112, 114 can be positioned below a protruding flange 810 (as shown in FIGS. 1B and 8A) of the pre-molded screw portion 962 to aid in removal of the connectable beverage bottle 150 after blow molding of the connectable beverage bottle 150.

In a yet further related embodiment, each of the left removable half-segment 163 and the right removable half-segment 164 can further include respectively a left inner top ledge 167 and a right inner top ledge 169, which are configured to receive respectively left and right sides of the flange 810 of the pre-molded screw portion 962.

In various related embodiments, as shown in FIG. 1A, mold components of the molding device 110, including the left/first upper mold portion 112, the right/second upper mold portion 114, and the lower mold portion 120 can include various elongated mounting apertures 191, 192, 193, which are configured to enable attachment to a molding machine 1000, such that control rods of the molding machine 1000 can engage with the mold components of the molding device 110, via sliding in to the elongated mounting apertures.

In an embodiment, as illustrated in FIGS. 9A and 9B, a method of molding 900 for molding a connectable beverage bottle 150 by using a molding device 110, wherein the method 900 can include:

a) Preparing 901 a blow pin 940, wherein a heated preform mold 960 is prepared around the blow pin 940, which is positioned for mold assembly;

b) Assembling 902 mold components of the molding device 110, wherein the mold components are positioned around the blow pin 940, as shown in FIG. 9B, such that:

i. Moving the lower mold portion 120 vertically upwards to a predetermined molding position of the lower mold portion 120 (relative to the blow pin 940 with the attached prepared preform mold 960);

ii. Moving each of the left/first upper mold portion 112 and the right/second upper mold portion 114 laterally inward, such that the left/first upper mold portion 112 and the right/second upper mold portion 114 are positioned side by side;

such that upper parts of the left/first upper mold portion 112 and the right/second upper mold portion 114 connect around an upper part of the blow pin 940, and such that lower parts of the left/first upper mold portion 112 and the right/second upper mold portion 114 connect around an upper part of the lower mold portion 120;

such that the blow pin 940 with the attached preform mold 960 protrudes into the entire molding cavity formed by the lower mold portion 120, the left/first upper mold portion 112, and the right/second upper mold portion 114;

such that an upper part of the preform mold 960 is configured as a pre-molded screw portion 962 of the connectable beverage bottle 150. Dual removable half-segments 163, 165 of respectively the left and right upper mold portions 112, 114 can be positioned below the pre-molded screw portion 962 to aid in removal of the connectable beverage bottle 150;

c) Perform blow molding 904, wherein compressed air is injected into the blow pin 940, such that the heated preform mold 960 is blown into the shape of the entire molding cavity inside the molding device 110, such that the heated preform mold 960 forms the connectable beverage bottle 150;

d) Removing 906 the blow pin, wherein the blow pin is extracted by a vertical upward movement;

e) Disassembling 908 mold components, such that:

i. the left/first upper mold portion 112 and the right/second upper mold portion 114 are moved laterally outward, toward respectively a left and a right side of the blow pin 940; and ii. the lower mold portion 120 is moved vertically downwards; and f) Extracting 910 the connectable beverage bottle 150.

Figure 10A:
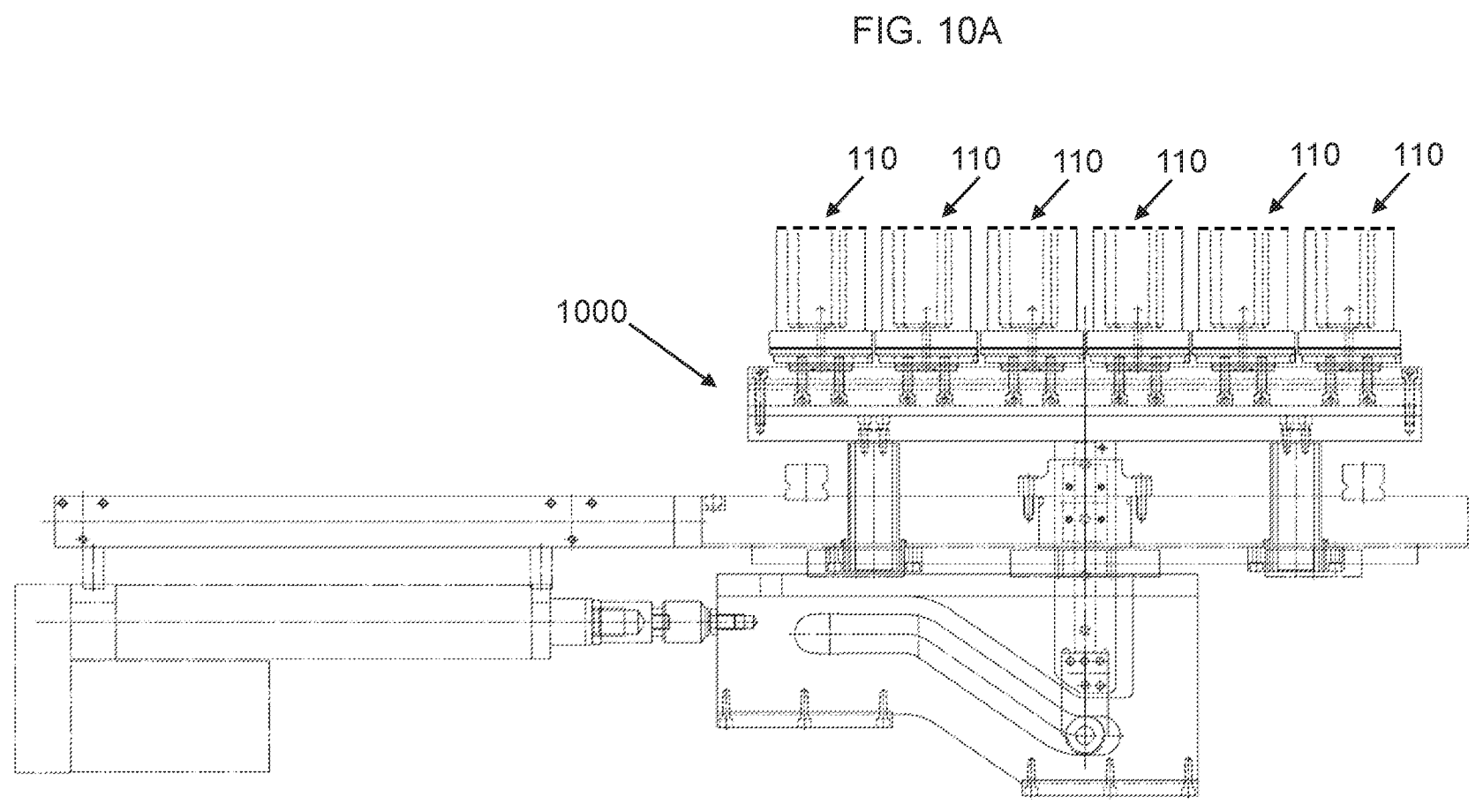
Figure 10B:
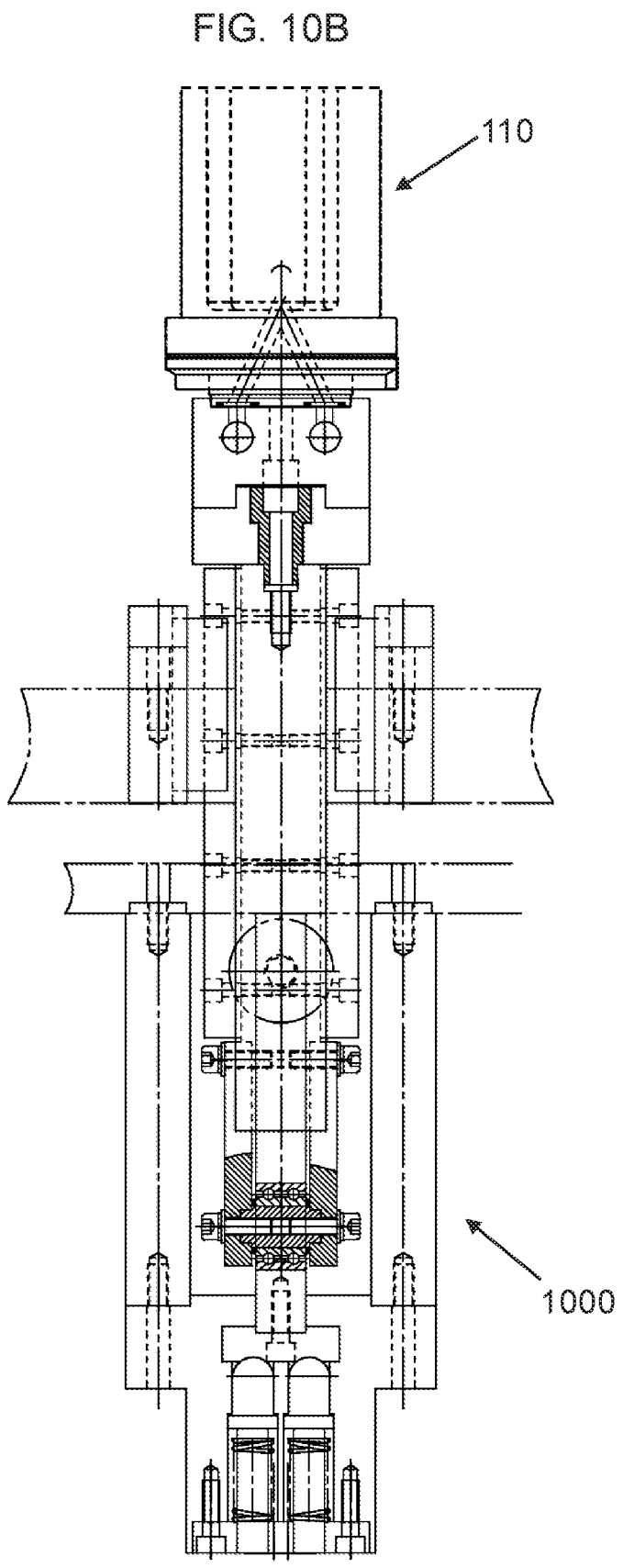
FIG. 10B is a cross-sectional schematic view of a portion of a molding machine that uses a molding system for manufacturing of connectable beverage bottles.
Figure 10C:
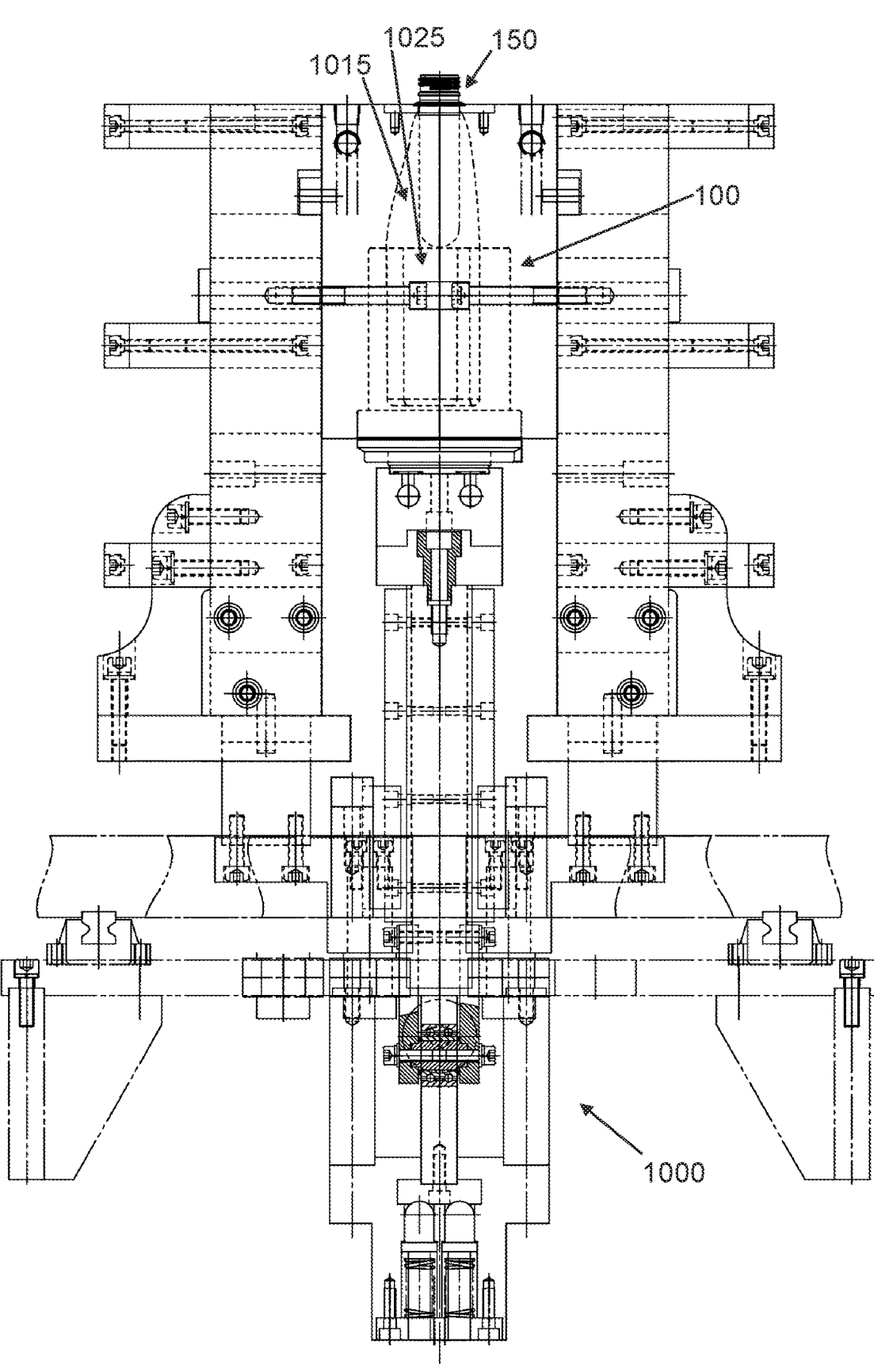
FIG. 10C is a cross-sectional schematic view of a portion of a molding machine that uses a molding system for manufacturing of connectable beverage bottles.

In related embodiments, as shown in FIGS. 10A, 10B, and 10C, the method for molding 900 can be implemented using a molding machine 1000, such that a plurality of molding processes 900 can be executed in parallel, typically in a synchronized manner. The molding machine 1000 shown in FIGS. 10A-10C supports six parallel molding processes 900, such that each process station continually repeats the corresponding molding processes 900, thereby producing a constant flow of newly blow molded connectable beverage bottles 150.

In related embodiments, each of the left/first upper mold portion 112, the right/second upper mold portion 114, and the lower mold portion 120 can be made from:

a) a metal or metal alloy, such as a stainless-steel alloy, or a high-strength aluminum alloy;

b) a ceramic material;

c) other materials suitable for making of molds; and d) combinations thereof.

In a related embodiment, the preform mold 960 used in the system for molding 100 can be made from:

a) A plastic material, including Polyethylene terephthalate and Acrylonitrile Butadiene Styrene;

b) A glass material;

c) A rubber material, which can be a synthetic or natural rubber material;

d) Other materials suitable for blow molding; and e) Combinations thereof.

In a related embodiment, FIGS. 8A-8I, shows an example of a connectable beverage bottle 150, which is manufactured by the system for molding 100, according to the method of molding 900. The connectable beverage bottle 150 comprises a plurality of substantial design changes for the purpose of enabling manufacturability and improving connectability in comparison to an earlier design of an earlier connectable beverage bottle as disclosed in U.S. Pat. No. 10,472,117, issued Nov. 12, 2019; U.S. Pat. No. D941,152, issued Jan. 18, 2022; and International PCT Application Publication No. WO2019241246A1, published Dec. 19, 2019; all three of which are hereby incorporated herein by reference in their entirety. The earlier connectable beverage bottle was not manufacturable due to particular features of the corresponding earlier design and also did not have reliable connectability.

In a further related embodiment, compared to the earlier connectable beverage bottle, improvements to the connectable beverage bottle 150 include:

a) all the corners or hard edges of the base of the connectable beverage bottle 150 have been rounded out completely so that the connectable beverage bottle 150 is much easier to blow mold during manufacturing;

b) the interlocking back part of the bottle, i.e. the vertical bottle locking protrusion 826, is substantially thinner and the opening of the bottle on the other side, i.e. the vertical bottle locking indentation 824, where the vertical bottle locking protrusion 826 goes in, is also correspondingly substantially thinner, as per further specification below; and c) the locking portion of the connectable beverage bottle 150, which is created by lower central mold portion 122, is now only about ⅓ of the bottle height of the connectable beverage bottle 150. In the original design of the earlier connectable beverage bottle, the entire back side was designed to lock into the bottle, but that original design has been found to be impossible to manufacture with available manufacturing methods and system.

In a related embodiment, a connectable beverage bottle 150 can include:

a) a hollow body including:

i. a top, ii. a bottom; and iii. a substantially cylindrical sidewall, which form a central cavity, said sidewall tapering inward adjacent to said hollow body's top to form a tapered neck which terminates at an opening for the ingress and egress of liquids or solids into said central cavity;

said sidewall including a pair of parallel grooves inset within the circumference of the substantially cylindrical sidewall which extend longitudinally from said hollow body's bottom to said tapered neck, said pair of grooves forming a longitudinally extending projection between said grooves which extends from said hollow body's bottom to said hollow body's tapered neck wherein said projection radially tapers to form a tapered rounded edge;

said sidewall further including a longitudinally extending channel located diametrically opposed to said longitudinally extending projection, said channel extending from the hollow body's bottom to said hollow body's tapered neck with said channel's depth diminishing in a tapered manner adjacent to said tapered neck to form a tapered rounded shelf which is substantially parallel and diametrically opposed to said projection's tapered rounded edge; and said projection and said channel are sized and configured so that said projection could be received within a channel of another like connectable beverage bottle so as to connect and affix to another like connectable beverage bottle.

In a related embodiment, the connectable beverage bottle 150 can be further configured such that:

a) said projection's tapered edge and said channel's tapered shelf permit said projection to be inserted into a channel of a like connectable bottle at the hollow body's bottom, but not at the hollow body's top; and b) said projection and said channel are sized and configured so that once said projection is inserted into a channel of a like connectable bottle, said projection is slideable within the channel until said projection's tapered edge would engage the channel's tapered shelf so as to prevent further movement or disengagement.

In another related embodiment, the connectable beverage bottle 150 can further include:

a) a bracket including a longitudinally extending post having a tapered top, said post sized and configured to have the same shape as said channel so as to be received within channel, and said bracket including a fastener means for affixing said bracket to another object.

In a further related embodiment of the connectable beverage bottle 150, said fastener means can include a pair of slots sized to receive a belt.

In a further related embodiment of the connectable beverage bottle 150, said fastener means can include a hook.

In a further related embodiment, as shown in FIGS. 8G and 8H, the connectable beverage bottle 150 can be configured such that:

a) a horizontal overhang 813 of the vertical bottle locking indentation 824, from a bottom outer edge 812 of the vertical bottle locking indentation 824 to a top outer edge of the vertical bottle locking indentation 824, which is in a range of 5-30% or 10-25% of a maximum depth 819 of the vertical bottle locking indentation 824;

b) a maximum protrusion width 827 of the vertical bottle locking protrusion 826 is in range of 25%-35% of a maximum bottle width 856;

c) a right front vertical indentation 830 on a right side of the vertical bottle locking protrusion 826, wherein the right front vertical indentation 830 is configured with a concave right inner surface, such that an opening angle 838, between an inner right tangent line 834 of an inner end of the concave right inner surface (in an inner right transition point, where the concave inner surface connects with an inner convex right surface) and an outer right tangent line 832 of an outer end of the concave right inner surface (in an outer right transition point, where the concave inner surface connects with an outer convex right surface);

d) a maximum right opening width 836 of the right front vertical indentation 830 between the outer right transition point and the inner right transition point can be in range of 70-90% or 75-85% of a maximum protrusion width 827 of the vertical bottle locking protrusion 826;

e) a left front vertical indentation 840 on a left side of the vertical bottle locking protrusion 826, wherein the left front vertical indentation 840 is configured with a concave left inner surface, such that a left opening angle 838, between an inner left tangent line 844 of an inner end of the concave left inner surface (in an inner left transition point, where the concave inner surface connects with an inner convex left surface) and an outer left tangent line 842 of an outer end of the concave right inner surface (in an outer right transition point, where the concave inner surface connects with an outer convex left surface); and f) a maximum left opening width 846 of the left front vertical indentation 840 between the outer left transition point and the inner left transition point can be in range of 70-90% or 75-85% of a maximum protrusion width 827 of the vertical bottle locking protrusion 826.

In a related embodiment, as shown in FIG. 8I, a combination of connectable beverage bottles 150 can include:

a) a first connectable beverage bottle 150, 801, which can include:

i. a hollow body including a top, a bottom and a substantially cylindrical sidewall which form a central cavity, said sidewall tapering inward adjacent to said hollow body's top to form a tapered neck which terminates at an opening for the ingress and egress of liquids or solids into said central cavity; wherein:

1. said sidewall including a pair of parallel grooves inset within the circumference of the substantially cylindrical sidewall which extend longitudinally from said hollow body's bottom to said tapered neck, said pair of grooves forming a longitudinally extending projection between said grooves which extends from said hollow body's bottom to said hollow body's tapered neck wherein said projection radially tapers to form a tapered rounded edge;

2. said sidewall further including a longitudinally extending channel located diametrically opposed to said longitudinally extending projection, said channel extending from the hollow body's bottom to said hollow body's tapered neck with said channel's depth diminishing in a tapered manner adjacent to said tapered neck to form a tapered rounded shelf which is substantially parallel and diametrically opposed to said projection's tapered rounded edge; and b) a second connectable beverage bottle 150, 802, which can include:

i. a hollow body including a top, a bottom and a substantially cylindrical sidewall which form a central cavity, said sidewall tapering inward adjacent to said hollow body's top to form a tapered neck which terminates at an opening for the ingress and egress of liquids or solids into said central cavity; wherein:

1. said sidewall including a pair of parallel grooves inset within the circumference of the substantially cylindrical sidewall which extend longitudinally from said hollow body's bottom to said tapered neck, said pair of grooves forming a longitudinally extending projection between said grooves which extends from said hollow body's bottom to said hollow body's tapered neck wherein said projection radially tapers to form a tapered rounded edge;

2. said sidewall further including a longitudinally extending channel located diametrically opposed to said longitudinally extending projection, said channel extending from the hollow body's bottom to said hollow body's tapered neck with said channel's depth diminishing in a tapered manner adjacent to said tapered neck to form a tapered rounded shelf which is substantially parallel and diametrically opposed to said projection's tapered rounded edge; and 3. said first bottle's projection sized and configured to have the same shape as said channel so as to be received within said second bottle's channel so as to connect and affix to said first bottle to said second bottle.

Here has thus been described a multitude of embodiments of the molding system 100, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A molding system for molding a connectable beverage bottle, the molding system comprising:
   a molding device, comprising:
   a left upper mold portion, which comprises a left upper molding cavity;
   a right upper mold portion, which comprises a right upper molding cavity; and
   a lower mold portion, which comprises a lower molding cavity which is configured to mold a lower portion, the lower mold portion having a height approximately one third of the height of the connectable beverage bottle;
   wherein the left upper mold portion and the right upper mold portion are configured to be positioned side by side, such that the left upper molding cavity and the right upper molding cavity form a combined upper molding cavity which is configured to mold an upper portion of the connectable beverage bottle, such that the left upper mold portion and the right upper mold portion are laterally removable after blow molding of the connectable beverage bottle inside the combined upper molding cavity formed by the left upper mold portion and the right upper mold portion; and
   wherein at least an upper part of the lower mold portion is configured to be positionable between lower ends of the left upper mold portion and the right upper mold portion, such that the lower molding cavity is configured to combine with the combined upper molding cavity to form an entire molding cavity, which is configured to mold the connectable beverage bottle, such that the lower mold portion is configured to be vertically downward removable after blow molding of the connectable beverage bottle.

2. The molding system of claim 1, wherein the lower mold portion further comprises: a lower central mold portion, which comprises a penetrating lower central aperture, which is configured to mold a lower central portion of the connectable beverage bottle into an interlocking/connectable shape.

3. The molding system of claim 2, wherein the lower central mold portion is further configured with a vertical mold locking protrusion, which protrudes into a vertical front of the penetrating lower central aperture, wherein the vertical mold locking protrusion is configured to mold a vertical bottle locking indentation of the lower central portion of the connectable beverage bottle.

4. The molding system of claim 3, wherein the lower central mold portion is further configured with a vertical mold locking indentation, which is positioned along a vertical rear of the penetrating lower central aperture, wherein the vertical mold locking indentation is configured to mold a vertical bottle locking protrusion of the lower central portion of the connectable beverage bottle.

5. The molding system of claim 2, wherein the lower mold portion further comprises:
   a lower bottom mold portion, which is connected to a bottom of the lower central mold portion, wherein the lower bottom mold portion comprises a lower bottom indentation, which is configured to mold a lower bottom portion of the connectable beverage bottle, such that the penetrating lower central aperture and the lower bottom indentation combine to form the combined lower molding cavity.

6. The molding system of claim 5, wherein the lower mold portion further comprises:
   a lower mold support assembly, which is connected to a bottom of the lower bottom mold portion, such that the lower mold support assembly is configured to provide support for the lower central mold portion and the lower bottom mold portion;
   wherein the lower mold support assembly is configured to connect with a molding machine to enable a vertical movement of the lower mold portion.

7. The molding system of claim 2, wherein the left upper mold portion further comprises:
   a left receiving indentation, which is positioned below the left upper molding cavity, wherein the left receiving indentation is configured to receive a left side of the lower central mold portion; and
   wherein the right upper mold portion further comprises:
   a right receiving indentation, which is positioned below the right upper molding cavity, wherein the right receiving indentation is configured to receive a right side of the lower central mold portion;
   such that, when the left upper mold portion and the right upper mold portion are positioned side by side, the left receiving indentation and the right receiving indentation form a combined receiving cavity, which is configured to receive the lower mold portion.

8. The molding system of claim 7, wherein each of the left receiving indentation and the right receiving indentation are configured as a half cylinder, such that the combined receiving cavity is cylindrical; and wherein an outer vertical surface of the lower mold portion is cylindrical.

9. The molding system of claim 1, wherein the left upper mold portion further comprises:
   an upper left penetrating indentation, which is positioned in a left inner side of a left top surface of the left upper mold portion, such that the upper left penetrating indentation penetrates from the left top surface of the left upper mold portion to the left upper molding cavity; and
   wherein the right upper mold portion further comprises:
   an upper right penetrating indentation, which is positioned in a right inner side of a right top surface of the right upper mold portion, such that the upper right penetrating indentation penetrates from the right top surface of the right upper mold portion to the right upper molding cavity;
   such that, when the left upper mold portion and the right upper mold portion are positioned side by side, the upper left penetrating indentation and the upper right penetrating indentation form a combined upper penetrating aperture, which penetrates from a combined top surface of the molding device to the combined upper molding cavity.

10. The molding system of claim 9, wherein the molding device further comprises:
   a) a left removable half-segment, which comprises a left half opening; and
   b) a right removable half-segment, which comprises a right half opening;
   wherein the left upper mold portion further comprises:
   an upper left surface indentation, which is positioned in the left top surface of the left upper mold portion, such that the upper left surface indentation is configured to form a left ledge along the upper left penetrating aperture;
   such that the left removable half-segment is configured to be removably positioned in the upper left surface indentation; and wherein the right upper mold portion further comprises:

an upper right surface indentation, which is positioned in the right top surface of the right upper mold portion, such that the upper right surface indentation is configured to form a right ledge along the upper right penetrating aperture;

such that the right removable half-segment is configured to be removably positioned in the upper right surface indentation;

such that, when the left upper mold portion and the right upper mold portion are positioned side by side with the left removable half-segment positioned in the upper left surface indentation and the right removable half-segment positioned in the upper right surface indentation:

the left half opening and the right half opening form a combined segment opening, which is aligned with the combined upper penetrating aperture.

\* \* \* \* \*